US005625425A

United States Patent [19]
Kranhouse

[11] Patent Number: 5,625,425
[45] Date of Patent: Apr. 29, 1997

[54] DIVING MASK WITH LENSES AND METHOD OF FABRICATING THE SAME

[76] Inventor: Jon Kranhouse, 838 Hartzell St., Pacific Palisades, Calif. 90272

[21] Appl. No.: 114,551

[22] Filed: Aug. 30, 1993

Related U.S. Application Data

[63] Continuation-in-part of PCT/US92/07321, Aug. 28, 1992, which is a continuation-in-part of Ser. No. 750,988, Aug. 28, 1991, abandoned.

[51] Int. Cl.$^6$ .................................................. G02C 1/00
[52] U.S. Cl. ................................................. 351/43; 351/41
[58] Field of Search ............................... 351/43, 62, 47, 351/57, 41, 158; 2/435, 436, 437, 428, 429, 430

[56] References Cited

U.S. PATENT DOCUMENTS

| | | |
|---|---|---|
| Re. 30,804 | 11/1981 | Lindemann et al. . |
| 1,742,412 | 1/1930 | O'Flanagan . |
| 2,008,530 | 7/1935 | Wick . |
| 2,088,262 | 7/1937 | Grano . |
| 2,730,014 | 1/1956 | Ivanoff et al. . |
| 2,928,097 | 3/1960 | Neufeld . |
| 3,031,674 | 5/1962 | Ring .......................................... 351/47 |
| 3,040,616 | 6/1962 | Simpson . |
| 3,051,957 | 9/1962 | Chan . |
| 3,320,018 | 5/1967 | Pepke . |
| 3,636,250 | 1/1972 | Haeff . |
| 3,672,750 | 6/1972 | Hagen . |
| 3,733,981 | 5/1973 | Buchanan . |
| 3,899,244 | 8/1975 | Mulder . |
| 3,944,345 | 3/1976 | Decorato . |
| 4,051,557 | 10/1977 | Bengston et al. . |
| 4,241,898 | 12/1980 | Segrest . |
| 4,373,788 | 2/1983 | Herbert . |
| 4,455,688 | 6/1984 | Poe . |
| 4,607,398 | 8/1986 | Faulconer . |
| 4,832,049 | 5/1989 | Matsushita et al. . |
| 4,856,120 | 8/1989 | Hart . |

(List continued on next page.)

FOREIGN PATENT DOCUMENTS

| | | |
|---|---|---|
| 63-109412 | 5/1988 | Japan . |
| 131114 | 5/1959 | U.S.S.R. . |
| WO9117467 | 11/1991 | WIPO . |

OTHER PUBLICATIONS

"The Dome Port in Underwater Photography," by Gomer T. McNeil, *Skin Diver Magazine*, Oct. 19, 1970.

"Optical Fundamentals of Underwater Photograph," by Gomer T. McNeil, Edwards Brothers, Inc., Second Edition, pp. 1–58, 1972.

*American Journal of Ophthalmology*, "Lens System for Water–to–Air Vision in Submerged Eye," T.D. Duane, vol. No. 48, Issue No. 2, p. 265, Aug. 1959.

*Primary Examiner*—Hung X. Dang
*Attorney, Agent, or Firm*—Oppenheimer Poms Smith

[57] ABSTRACT

A diving mask having hemispherically-shaped lenses mounted on a flexible gasket or portion and fitted to the contours of a user's face. Laser scanning or topographic mapping is used to determine the contours of the user's face. Edges of the hemispherically-shaped lenses are then shaped to fit the contours of the face. As a result, the spherical center of the lenses substantially coincides with the optical nodal point of the user's eyes, or the center of rotation of the eyes. This virtually eliminates the phenomenon of underwater magnification-distortion caused by the difference in refractive indices of water and air. The diving mask may also have hemispherically-shaped lenses mounted on a support portion. The support portion, in turn, is mounted on a flexible gasket of selected size. A secure seal is provided between the diving mask and a user's face by the flexible gasket. The diving mask may be provided with at least one purge valve. The diving mask may be used with retractable corrective lenses, if desired. The diving mask may be used with bottom lenses which provide vision both above and below water. Hemispherically-shaped meniscus lenses may be used with the diving mask. The meniscus lenses are designed to provide optimal peripheral vision, while reducing weight and facilitating drainage of water from the mask.

64 Claims, 16 Drawing Sheets

U.S. PATENT DOCUMENTS

| | | |
|---|---|---|
| 5,094,520 | 3/1992 | Reshef et al. . |
| 5,137,341 | 8/1992 | Gendol et al. . |
| 5,187,502 | 2/1993 | Howell . |
| 5,189,447 | 2/1993 | Oleson . |
| 5,191,364 | 3/1993 | Kopfer . |
| 5,204,700 | 4/1993 | Sansalone . |

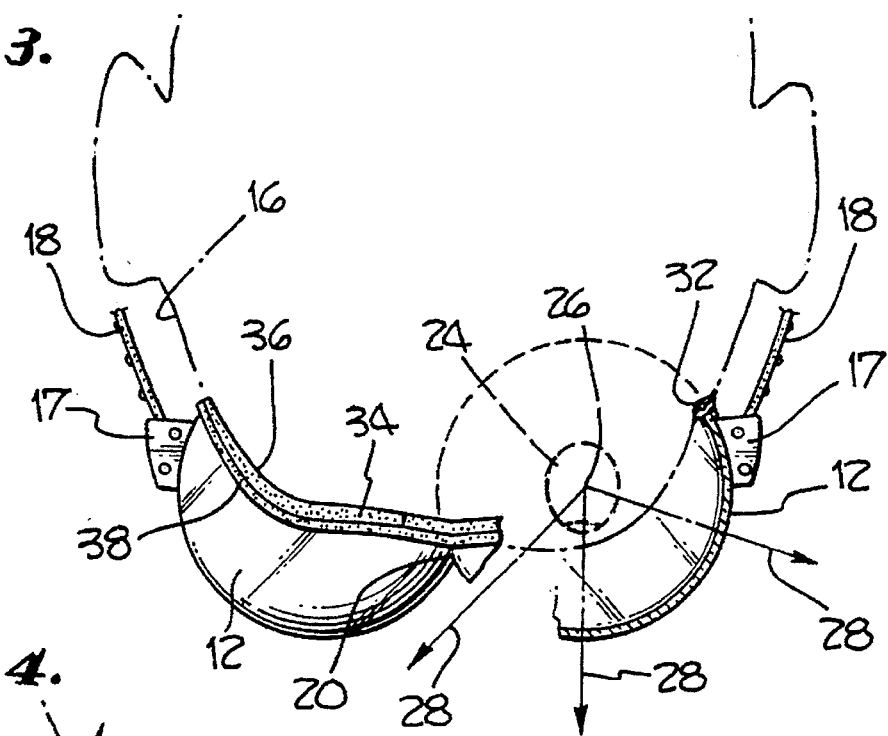
Fig. 3.
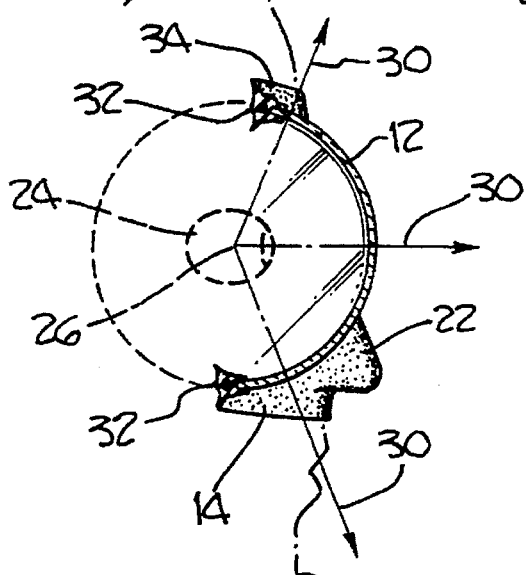
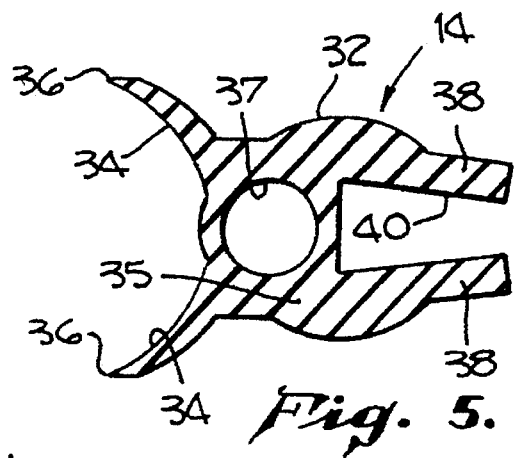
Fig. 5.
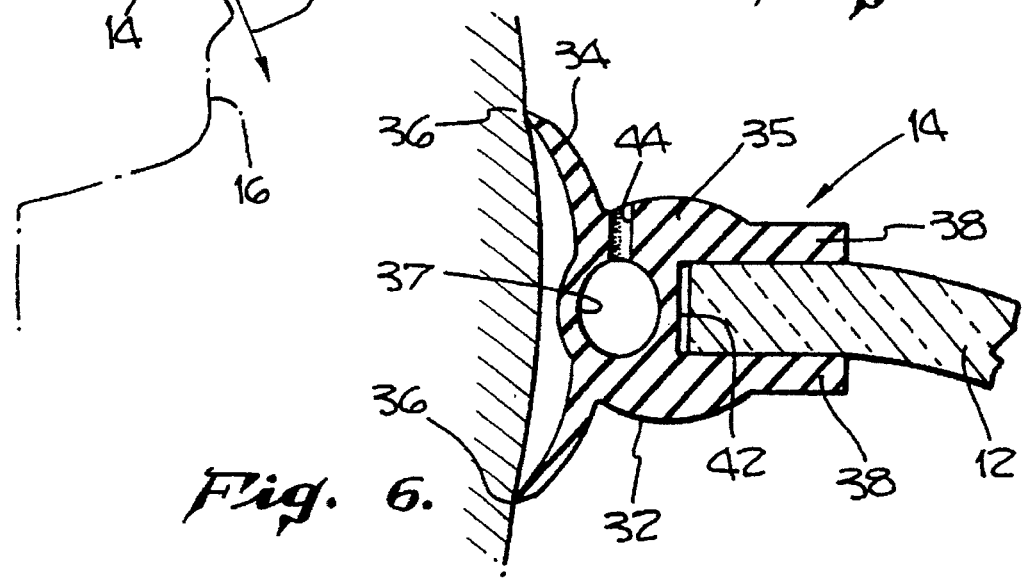
Fig. 6.

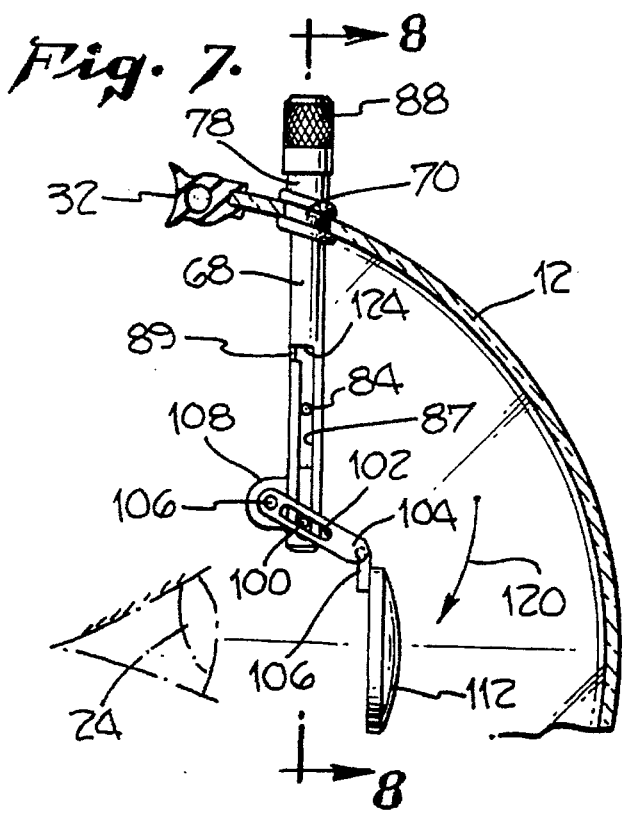
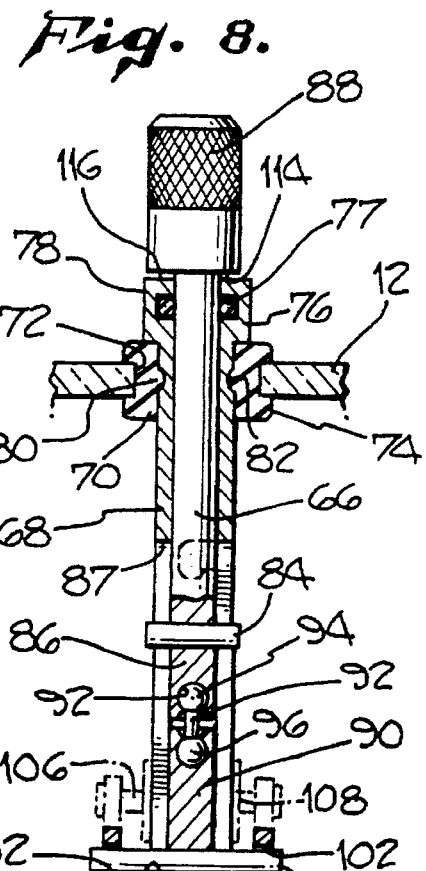
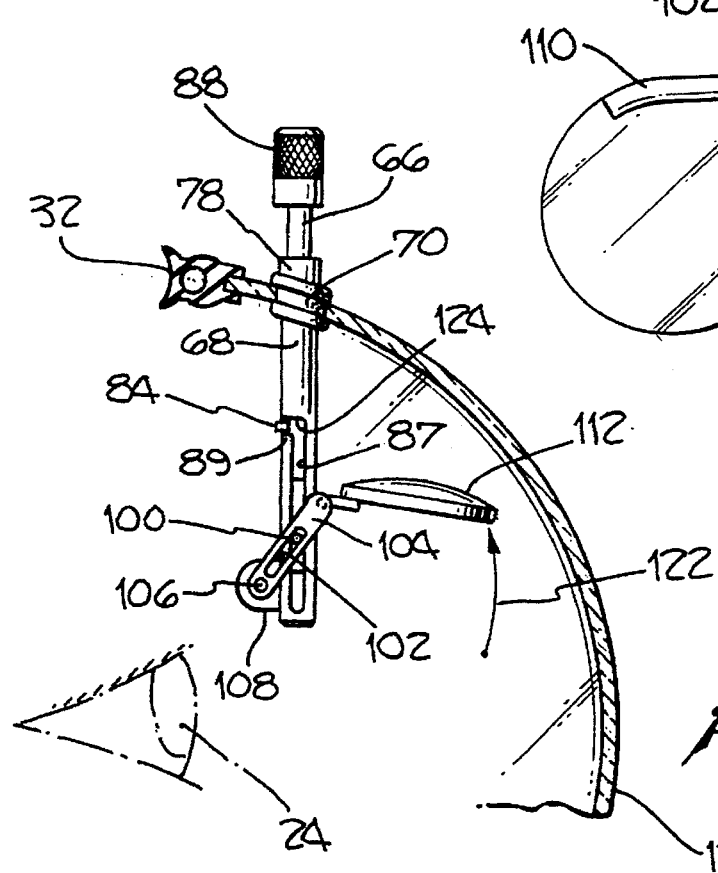
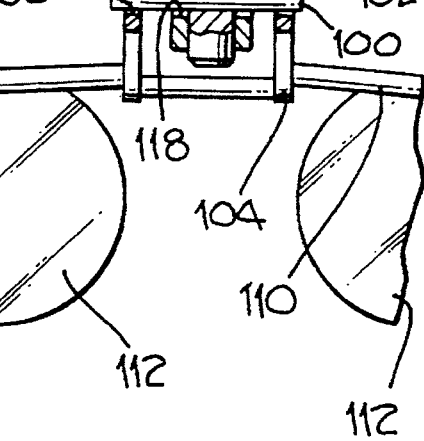

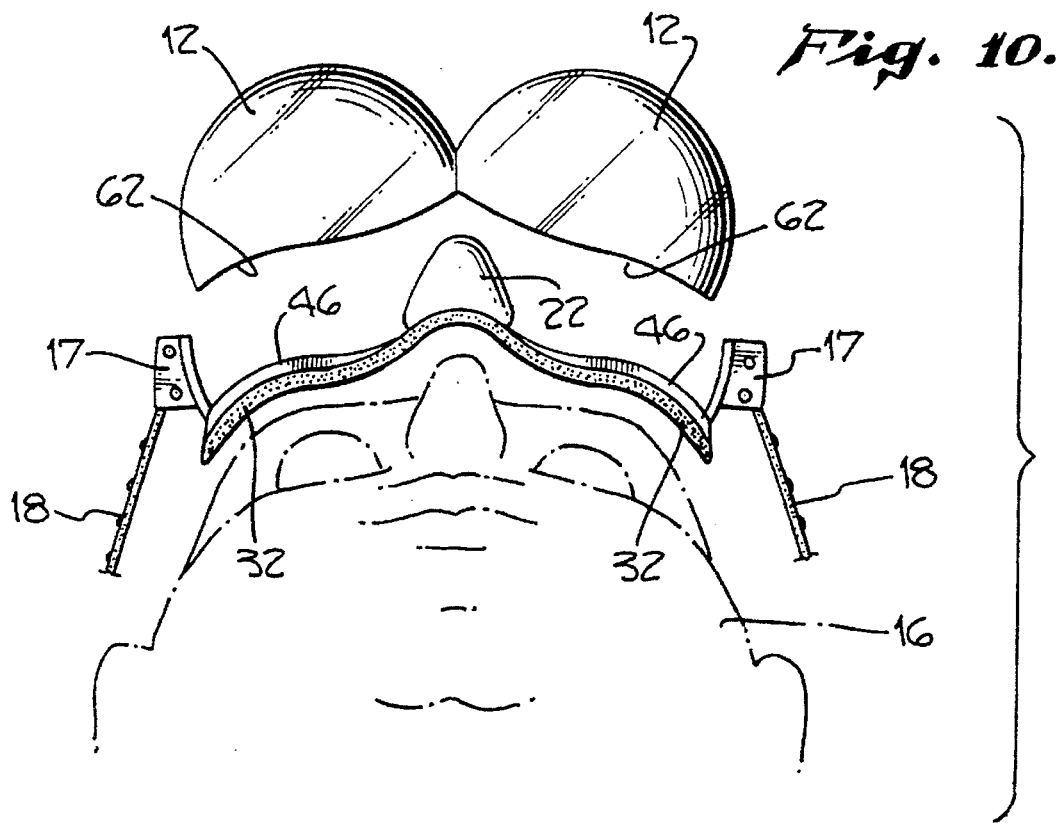
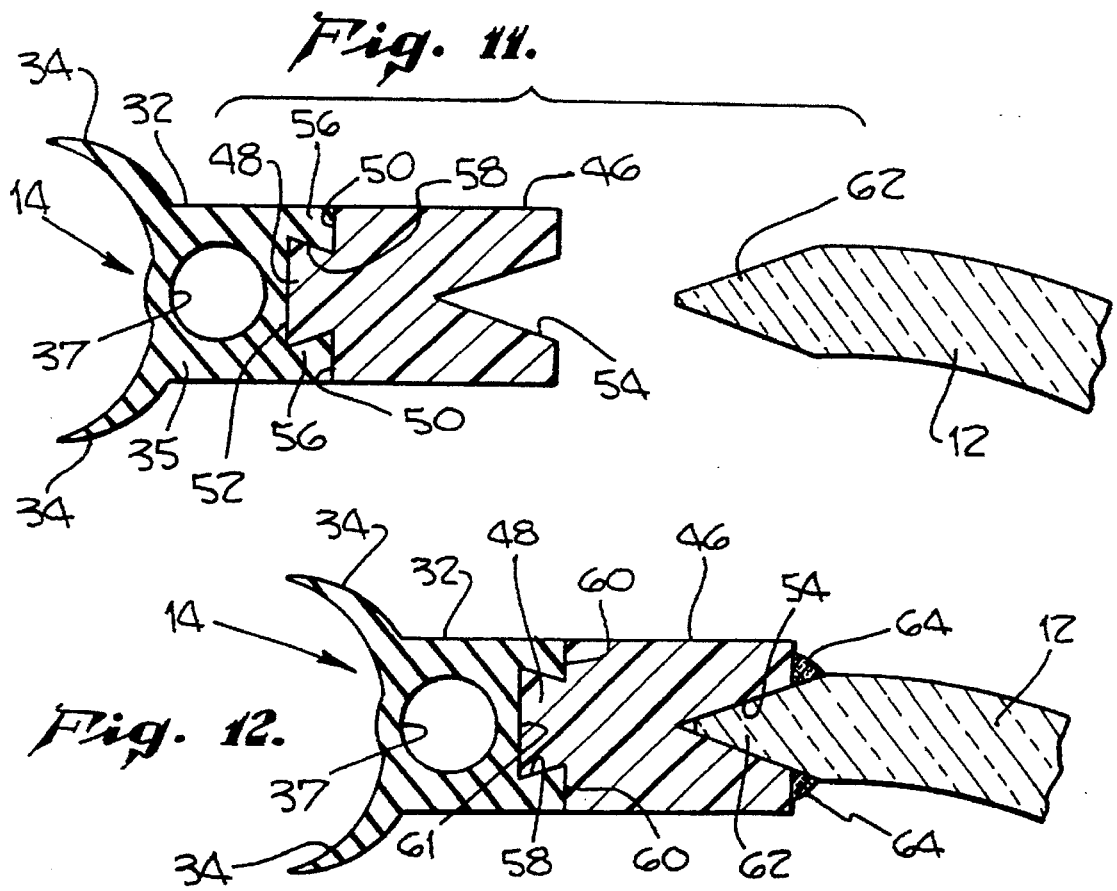

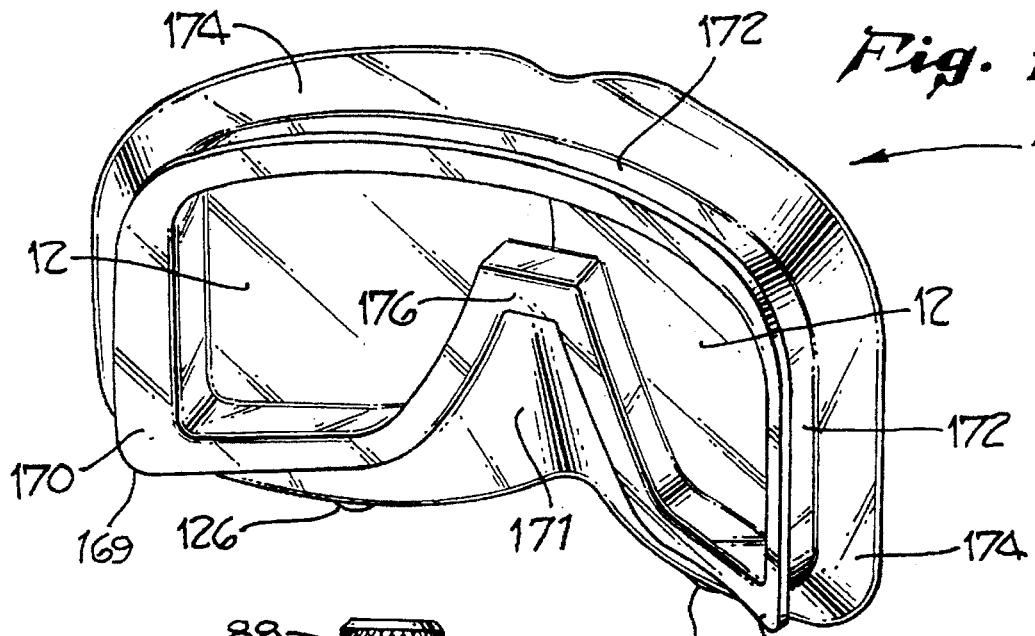
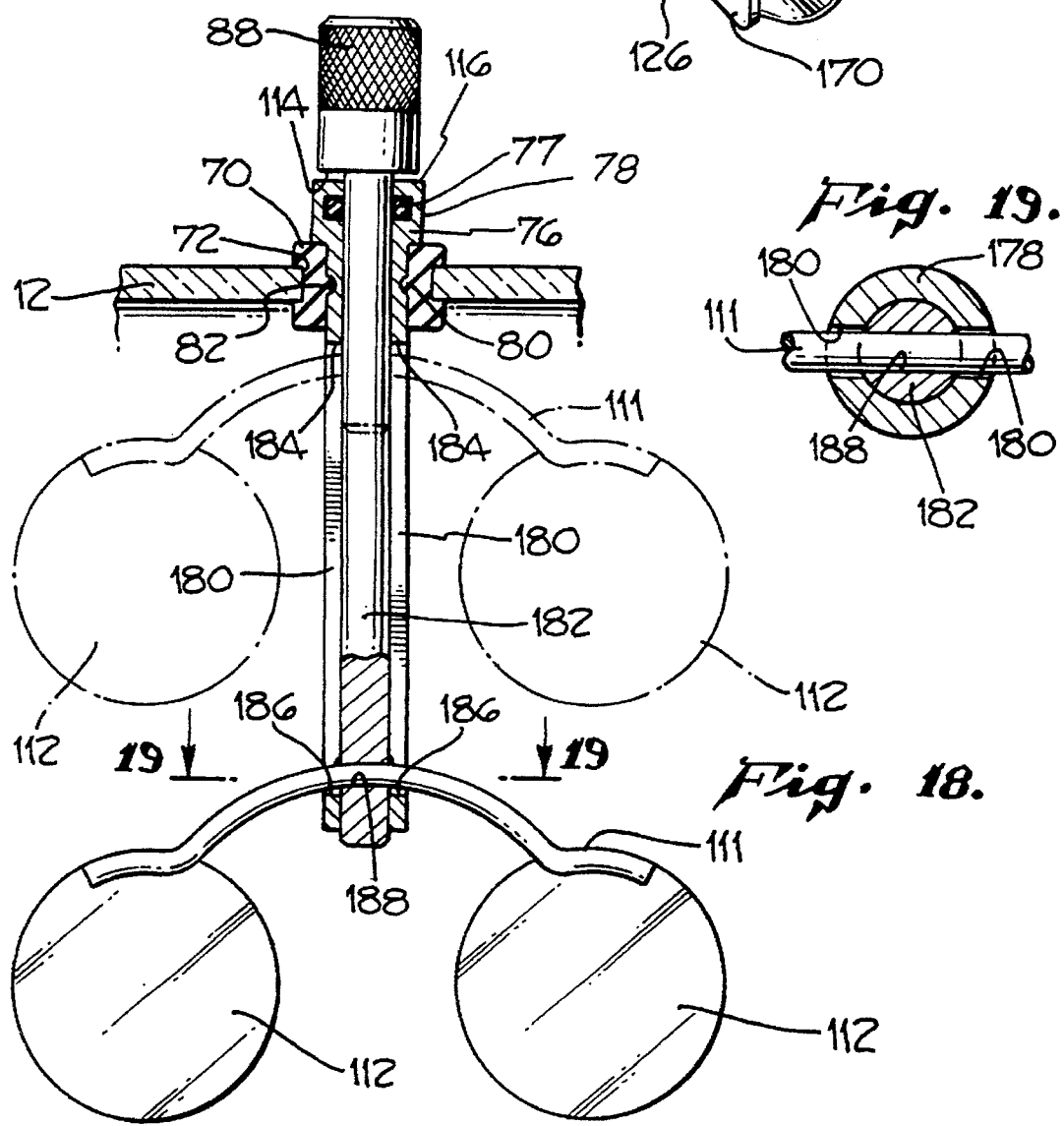

DIVING MASK WITH LENSES AND METHOD OF FABRICATING THE SAME

CROSS-REFERENCE TO RELATED APPLICATION

This application is a continuation-in-part of International Application No. PCT/US92/07321, filed Aug. 28, 1992, entitled "DIVING MASK WITH LENSES AND METHOD OF FABRICATING THE SAME," which designated the U.S.; and which is a continuation-in-part of application, Ser. No. 07/750,988, filed Aug. 28, 1991 now abandoned, and entitled "DIVING MASK WITH FITTED LENSES AND METHOD OF FABRICATING THE SAME."

BACKGROUND OF THE INVENTION

The present invention relates generally to underwater face masks and, more particularly, to underwater diving masks having eyepieces or lenses mounted on a flexible gasket.

In the past, a variety of underwater face masks have been used for sporting and other activities such as skin and scuba diving. Early underwater face masks typically had several common features, including a contiguous air space shared by the diver's nose and eyes, generally flat, glass or plastic windows, eyepieces or ports fixed approximately perpendicularly to the wearer's straight-ahead viewing axis, and a flexible rubber or plastic support structure for holding the ports in position and trapping an air pocket against the wearer's face. A contiguous air pocket over both the wearer's nose and eyes, as opposed to a mask covering the eyes only, allows for equalizing pressure inside the mask with ambient water pressure as the wearer ascends and descends in the water. Such equalization is necessary to avoid injury to the wearer.

Such conventional flat-window face masks share a variety of shortcomings. The windows or eyepieces of conventional flat-window masks must be supported out from the face. Above and below water, the wearer's horizontal and vertical fields of view are severely limited by the flexible rubber or plastic structures providing such support, thereby creating a sense of "tunnel vision" and a closed-in, claustrophobic feeling. Above water, conventional flat-window masks provide no more than a 140 degree horizontal by 90 degree vertical field of view. Below water, because of the refraction-induced magnification distortion of an air-water viewing system, discussed more fully hereinbelow, this field of view is effectively reduced to approximately 105 degrees horizontal by 67.5 degrees vertical.

Additionally, conventional flat-window masks suffer quite significant magnification-distortion problems from the difference in refractive indices between water and air. Specifically, objects viewed on an axis perpendicular to the window appear approximately 33% larger and 25% closer than they actually are. The magnification-distortion of objects viewed off-axis is even larger.

Further, conventional flat-window masks create a significant amount of hydrodynamic drag and present a significant risk of slipping off the wearer's face if hit by an unanticipated or oblique-angle wave or current.

These and other flat-window mask problems have attempted to be overcome, with less than satisfactory results, by spherically-shaped eyepieces or lenses used for underwater masks. For example, U.S. Patent Nos. 3,899,244, issued to Mulder on Aug. 12, 1975, and 3,672,750, issued to Hagen on Jun. 27, 1972, disclose underwater masks that use built-in corrective lenses in addition to spherically-shaped lenses to improve viewing under water. As such, these masks do not provide optimum viewing characteristics under water without the use of additional corrective lenses. Other single and multiple lens systems used for underwater face masks that do not provide optimum viewing conditions are disclosed in U.S. Pat. Nos. 3,944,345, issued to Decorato on Mar. 16, 1976; 3,040,616, issued to Simpson on Jun. 26, 962; 2,088,262, issued to Grano on Jul. 27, 1937; 2,928,097, issued to Neufeld on Mar. 15, 1960; and 1,742,412, issued to O'Flanagan on Jan. 7, 1930.

U.S. Pat. No. 4,607,398, issued to Faulconer on Aug. 26, 1986, discloses a strap and retainer used for a diver's mask. U.S. Pat. No. 3,051,957, issued to Chan on Sep. 4, 1962, describes a diving mask having a supporting device used to hold the eyeglasses of a diver. In addition, U.S. Pat. No. 4,856,120, issued to Hart on Aug. 15, 1989, describes a purge valve used for a diving mask and a deflector attached to the mask and used to channel air bubbles expelled during purging to the sides of the mask. Another purge valve used for a diver's mask is disclosed in U.S. Pat. No. 4,241,898, issued to Segrest on Dec. 30, 1980.

SUMMARY OF THE INVENTION

Accordingly, it is an object of this invention to provide a diving mask which furnishes improved viewing characteristics under water.

It is another object of this invention to provide a diving mask which furnishes improved viewing characteristics under water, and may be used under water by divers who do not have to wear contact lenses or eyeglasses to correct eyesight when not under water.

It is still another object of this invention to provide a diving mask which furnishes improved viewing characteristics under water, and may be used under water by divers while not wearing contact lenses which correct eyesight above water.

It is still another object of this invention to provide a diving mask which furnishes improved viewing characteristics under water, and may be used under water by divers while wearing contact lenses which correct eyesight above water.

It is still another object of this invention to provide a diving mask which may be used both above and under water.

It is still another object of this invention to provide a diving mask which may be used both above and under water with additional corrective lenses if desired.

It is still another object of this invention to provide a diving mask which furnishes a secure seal between the mask and a wearer's face.

It is still another object of this invention to provide a method of fabricating such a diving mask.

These and other objects and advantages are attained by a diving mask having hemispherically-shaped lenses mounted on a flexible gasket and fitted to the contours of a user's face. Laser scanning or topographical mapping is used to determine the contours of a user's face. The perimeter edges of the hemispherically-shaped lenses are then sized to fit the contours of the face. As a result, the spherical center of each of the hemispherically-shaped lenses substantially coincides with the optical nodal point of one of the user's eyes. This improvement virtually eliminates the phenomenon of underwater magnification-distortion caused by the difference in refractive indices of water and air. Improved horizontal and vertical fields of view are also provided by the hemispherically-shaped lenses. A secure seal is provided between the diving mask and a user's face by the flexible gasket.

Another embodiment of the diving mask is provided having a standard pair of hemispherically-shaped lenses mounted on a contoured portion of the mask which is fitted to the contours of a user's face. The contoured portion is mounted on a flexible gasket.

In still another embodiment of the diving mask, the hemispherically-shaped lenses are designed so that the spherical center of curvature of each of the lenses substantially coincides with the center of rotation of one of a user's eyes.

In still another embodiment of the diving mask, a shaft is mounted on the hemispherically-shaped lenses. The shaft is coupled to a pair of retractable corrective lenses, and may be used to lower the corrective lenses to a position in front of a user's eyes and to raise the lenses to a position above the eyes. The corrective lenses may be used by near- and far-sighted users.

In still another embodiment of the diving mask, the hemispherically-shaped lenses are mounted on a support portion having a peripheral flange. The support portion, in turn, is mounted on a flexible gasket of selected size. The diving mask may have at least one purge valve in the support portion.

In still another embodiment, a diving mask is provided having a purge valve in at least one of the hemispherically-shaped lenses. The purge valve is located at the front and bottom of the lens and in an area used to collect water which has leaked into the mask. The collecting area is angled to facilitate expelling water from the diving mask through the purge valve so that exhaust bubbles pass toward the back of the mask, away from the field of vision of a diver.

In still another embodiment, the diving mask is provided with a bottom lens which facilitates drainage of water from the mask. The bottom lens may also be used for viewing both above and below the water. The diving mask may also have an additional lens mounted inside the mask which may be used by either nearsighted or farsighted divers. A member may be joined to the additional lens in order to provide trapped dry-air volume inside the mask.

In still another embodiment of the diving mask, a baffle may be used with textured or coated surfaces in order to provide a translucent member for the purpose of eliminating double vision. Also, the ends of the lenses may be bent or formed inwardly toward a diver's face in order to provide a reduced air volume inside the mask.

In still another embodiment of the mask, hemispherically-shaped meniscus lenses are used to provide reduced weight and a reduced air volume inside the mask. The curvatures of the inner and outer surfaces of the meniscus lenses are chosen to produce an effective zero diopter value under water. The spherical centers of curvature of the meniscus lenses are located beneath the centers of a diver's eye in order to reduce the weight of the mask and to improve drainage.

In still another embodiment of the diving mask, a perimeter clamp is used to clamp a conventional face seal to a support portion of the mask. Integral housings may be formed in the support portion for purge valves. Integral housings for the purge valves may also be formed in the perimeter clamp. A purge valve is provided for each lens.

The various features of the present invention will be best understood together with further objects and advantages by reference to the following description of the preferred embodiments taken in conjunction with the accompanying drawings.

BRIEF DESCRIPTION OF THE DRAWINGS

FIG. 3 is a partial cross-sectional view of the diving mask taken in the direction of arrows 3—3 shown in FIG. 1, illustrating how the spherical center of curvature of one of the hemispherically-shaped lenses substantially coincides with the optical nodal point of one of the user's eyes;

FIG. 4 is a cross-sectional view of the diving mask taken in the direction of arrows 4—4 shown in FIG. 2 also showing how the spherical center of curvature substantially coincides with the optical nodal point;

FIG. 5 is an enlarged detailed cross-sectional view of a skirt portion of the flexible gasket of the diving mask of FIG. 1;

FIG. 6 is an enlarged detailed cross-sectional view of the skirt portion showing how one of the hemispherically-shaped lenses is mounted on the skirt portion, and how apertures are provided in the skirt portion to allow water to fill a cavity in the skirt portion, helping to provide a cushioning effect against the user's face;

FIG. 7 is a partial cross-sectional view of another embodiment of the diving mask having a turning shaft mounted on the hemispherically-shaped lenses, which may be used to lower retractable corrective lenses in front of a user's eyes;

FIG. 8 is a partial cross-sectional view of the turning shaft and hemispherically-shaped lenses taken in the direction of arrows 8—8 shown in FIG. 7;

FIG. 9 is a partial cross-sectional view of the diving mask, taken like FIG. 7, illustrating how the turning shaft may be used to raise the retractable corrective lenses from a position in front of the user's eyes, as shown in FIG. 7, to a position above the eyes;

FIG. 10 is an exploded view of another embodiment of the diving mask having a standard pair of hemispherically-shaped lenses mounted on a contoured portion of the mask which is fitted to the contours of a user's face, and mounted on the flexible gasket;

FIG. 11 is an exploded, enlarged, detailed cross-sectional view of the skirt portion of the flexible gasket, the contoured portion of the mask and one of the hemispherically-shaped lenses, showing the contoured portion attached to the gasket;

FIG. 12 is an enlarged detailed cross-sectional view, taken like FIG. 11, showing the hemispherically-shaped lens attached to the contoured portion;

FIG. 17 is a perspective view of another embodiment of the diving mask having a pair of hemispherically-shaped lenses mounted on a peripheral flange of a support portion of the mask;

FIG. 18 is a partial cross-sectional view of another embodiment of a shaft shown mounted on the hemispherically-shaped lenses which may be used to raise and lower corrective lenses in front of a user's eyes;

FIG. 19 is an enlarged cross-sectional view taken in the direction of arrows 19—19 shown in FIG. 18;

FIG. 26 is a partial cross-sectional view taken in the direction of FIG. 3, showing how an end portion of one of the hemispherically-shaped lenses may be contoured inwardly toward a diver's face in order to reduce the size of the diving mask and the trapped air space or volume within the mask;

FIG. 27 is a partial cross-sectional view taken in the direction of FIG. 3, showing how a central translucent member may be attached to the hemispherically-shaped lenses where the lenses are joined together in order to prevent double vision;

DESCRIPTION OF THE PREFERRED EMBODIMENTS

The following specification taken in conjunction with the drawings sets forth the preferred embodiments of the present invention in such a manner that any person skilled in the art can make or use the invention. The embodiments of the invention disclosed herein are the best modes contemplated by the inventor for carrying out his invention in a commercial environment, although it should be understood that various modifications can be accomplished within the parameters of the present invention.

Figure 1:
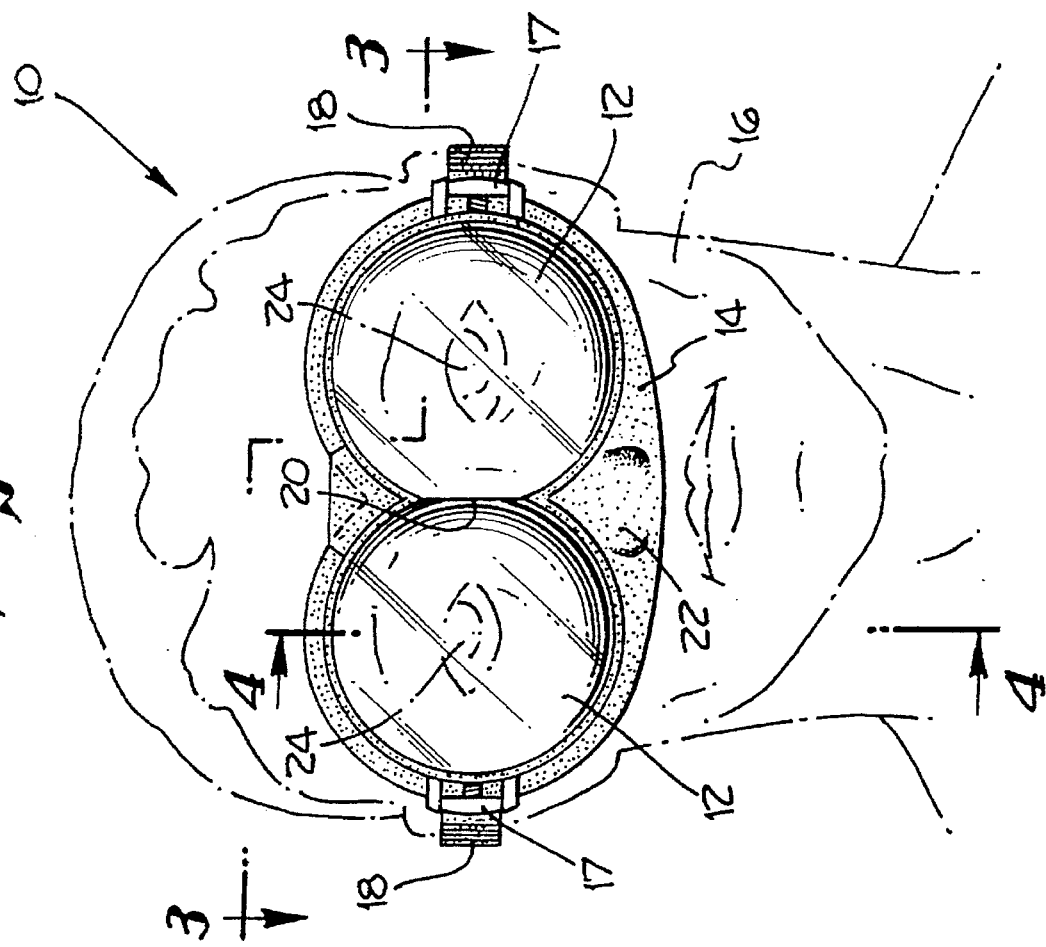
FIG. 1 is a front elevational view of a diving mask with two generally hemispherically-shaped lenses mounted on a flexible gasket or portion and fitted to the face of a user, illustrating the principles of the present invention.
Figure 2:
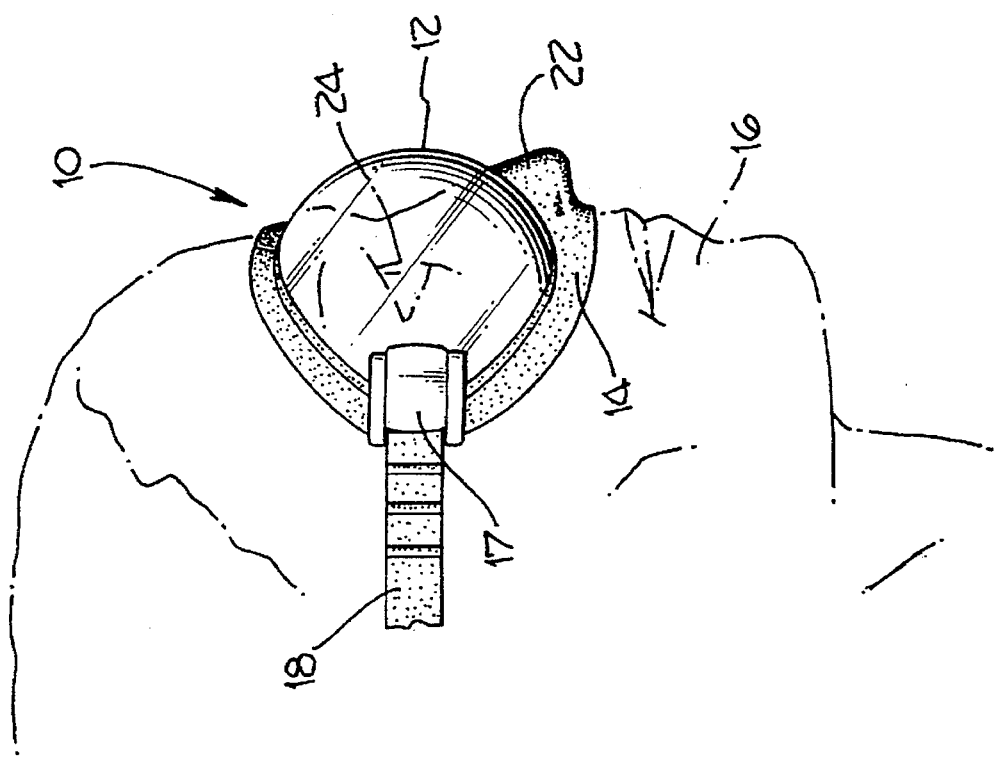
FIG. 2 is a side elevational view of the diving mask of FIG. 1 shown worn on the head of the user.

FIGS. 1 and 2 show a preferred embodiment of the diving mask 10 of the present invention. The diving mask 10 has two eyepieces, or generally hemispherically-shaped lenses 12, mounted on a flexible gasket or portion 14 of the mask 10. Each lens 12 may be a segment or portion of a sphere.

It is important to note that each lens 12 may be smaller or larger than a hemisphere or may be only a segment or portion of a hemisphere. Therefore, "generally hemispherically-shaped lenses" or "hemispherically-shaped lenses," as used herein, refers to lenses that are shaped like hemispherically-shaped lens, or a portion thereof, or each such lens may be a segment or a portion of a spherically-shaped lens that is smaller or larger than one half of a sphere, or smaller or larger than a hemisphere.

The lenses 12 are preferably made of plastic, glass, or the like. However, any transparent, optically clear material may be used for the lenses 12. The thickness of the lenses 12 preferably has a range of approximately from about 1/20-inch to about 1/2-inch. However, any thickness may be used. It is important to note that any minimum thickness that provides structural integrity may be used for the lenses 12. The diving mask 10 is secured to the face 16 of a user by straps 18 that are preferably fused or otherwise attached to the lenses 12 by, for example, members 17, or the like. As shown in FIGS. 1 and 3, the lenses 12 are preferably fused together at edge 20 adjacent the bridge of a user's nose. However, the lenses 12 may be separated by part of the flexible portion 14 running along the bridge of the user's nose (not shown), if desired.

The flexible gasket or portion 14 is preferably made out of a flexible or elastic plastic or rubber material such as silicone, neoprene, or the like. However, any other flexible material may be used for portion 14. A nose portion 22 of flexible portion 14 is also provided so that a seal is furnished between the user's face 16 and the diving mask 10, and an air space is provided between the lenses 12 and the user's eyes 24 and face 16 under the lenses 12. The air space provides air pressure inside the diving mask 10 which counteracts the ambient water pressure that exists outside the mask 10 when the user is under water and protects the user's eyes 24.

As discussed below, the contours of the user's face are scanned or topographically mapped and the lenses 12 are shaped to closely fit the contours of the user's face 16.

In order to provide optimum viewing characteristics under water, the edges or ends 42 of the lenses 12 (see FIG. 6) must closely fit the contours of a user's face 16 so that the spherical center of curvature of the hemispherically-shaped lenses 12 substantially coincides with the optical nodal point 26 of the user's eyes 24 as illustrated by arrows 28 and 30 in FIGS. 3 and 4, respectively. When the spherical center of curvature and optical nodal point substantially coincide, this results in virtually eliminating the phenomenon of underwater magnification-distortion caused by the difference in refractive indices of water and air which causes objects to appear about 33% larger and about 25% closer than they actually are. In addition, such coinciding of the spherical center of curvature and optical nodal point provides hemispherically-shaped lenses 12 that have a horizontal field of view of about 180 degrees and a vertical field of view of about 150 degrees.

The outside diameter of the hemispherically-shaped lenses 12 also determines the distance from the lenses 12 that a user's eye 24 must focus in order to see an image formed by an object under water. The theoretical basis for this is Snell's Law of Refraction, which for a basic hemispherical lens and paraxial light rays may be expressed as:

$$\frac{n}{s} + \frac{n^1}{s^1} = \frac{n^1 - n}{R}$$

where n=the index of refraction of the medium in which the object is located;

$n^1$=the index of refraction of the lens;

s=the distance of the object from the outer surface of the lens;

$s^1$=the location of the image formed from the outer surface of the lens; and

R=the radius of curvature of the lens.

Using n=1.34, the index of refraction of salt water, and n=1.49, the index of refraction of plexiglass, the following table indicates the distances from the front surface (cornea) of a user's eye 24 that the eye 24 must focus for different diameter hemispherically-shaped lenses having a lens thickness of 0.25 inches to clearly see the apparent image of an object located at different distances from the lenses. All dimensions are presented in inches. The chart assumes a distance from a center of rotation 150 of a person's eye to the outer surface of the cornea to be 0.5 inch. The importance of the center of rotation 150 is discussed later in connection with FIGS. 15 and 16.

| Exterior Dome Diameter | To focus from cornea to object at 12 inches | To focus from cornea to object at 25 inches | To focus from cornea to object at 50 inches | To focus from cornea to object at 120 inches | To focus from cornea to object at ∞ |
|---|---|---|---|---|---|
| 3.0 | 3.167 | 3.628 | 3.890 | 4.062 | 4.195 |
| 3.5 | 3.737 | 4.364 | 4.733 | 4.979 | 5.172 |
| 4.0 | 4.261 | 5.067 | 5.556 | 5.888 | 6.151 |
| 4.5 | 4.743 | 5.738 | 6.358 | 6.787 | 7.131 |
| 5.0 | 5.188 | 6.379 | 7.140 | 7.677 | 8.113 |
| 5.5 | 5.600 | 6.991 | 7.903 | 8.557 | 9.095 |
| 6.0 | 5.983 | 7.577 | 8.647 | 9.427 | 10.077 |
| 6.5 | 6.840 | 8.138 | 9.374 | 10.288 | 11.060 |
| 7.0 | 6.672 | 8.675 | 10.082 | 11.139 | 12.044 |
| 7.5 | 6.984 | 9.191 | 10.774 | 11.981 | 13.027 |
| 8.0 | 7.275 | 9.685 | 11.449 | 12.814 | 14.011 |
| 8.5 | 7.549 | 10.161 | 12.108 | 13.638 | 14.995 |
| 9.0 | 7.807 | 10.617 | 12.752 | 14.453 | 15.979 |

Taking an example where n=1.34, the index of refraction of salt water; $n^1$=1.34, the index of refraction of plexiglass; R=2.75 inches, the radius of curvature of a 5.5 inch diameter dome lens; and s=22.75 inches, the distance from the lens'outer surface of an object 25 inches from an eye's corneal surface, the solution for $s^1$ is −342.085 inches; i.e., the image is formed 342.085 inches from the dome lens'outer surface on the opposite side relative to the object.

The above equation is then solved for this image using the inside surface of the dome lens in which s, the object distance, is now −342.335 inches (compensating for the 0.25 inch thickness of the dome lens), n=1.49 (for the plexiglass), $n^1$=1 (for air), and R=2.5 inches (compensating for the 0.25 inch thickness of the dome lens). This results in a value for $s^1$ −4.991 inches, i.e., the image seen by the user is 4.991 inches from the inside surface of the dome lens toward the object. Add to this 2.5 inches for the inside radius of the dome lens, less the 0.5 inch for the distance from the center of rotation of the eyeball to the outer corneal surface, to arrive at 6.991 inches, as indicated in the chart for a 5.5 inch diameter dome and a 25 inch object distance.

The exterior diameter of the hemispherically-shaped lenses 12 preferably has a range of from about 4.25 inches to about 9 inches. However, any size diameter may be used for the lenses 12 depending on the wearer's vision, e.g., myopic wearers may opt for smaller sized domes.

Referring now to FIGS. 5 and 6, a skirt portion 32 of the flexible portion 14 is shown having a body portion 35 with an elongated cavity 37 running the length thereof, flexible curved extensions 34 and edges 36 that contact the contours of a user's face 16 (see FIG. 3), and clevis arms 38 that extend away from the face 16. The clevis arms 38 form a channel 40 which engages the ends or edges 42 of the lenses 12 (see FIG. 6). The lenses 12 may be attached to channel 40 using any desirable method such as by force fitting, using adhesive, by fusion of the parts, welding, or by any suitable fastening or clamping means. The edges 42 of the lenses 12 are formed to match the contours of a user's face 16 (see FIG. 3) which are measured by scanning or topographical mapping as discussed below.

A secure seal is provided between the flexible gasket 14 and the user's face 16. The skirt portion 32 of the gasket 14 has a plurality of apertures 44 passing through body portion 35 and into elongated cavity 37. The apertures 44 preferably are spaced about 0.5 inch apart along cavity 37 and cause the cavity 37 to fill with water when a user is under water, so that pressure inside the cavity 37 is equal to ambient water pressure, which provides a cushioning effect against the user's face 16.

In order to fit the perimeter edges 42 of the lenses 12 to the contours of a user's face 16, laser scanning or topographical mapping may be used to accurately determine the contours of the face 16. Apparatus and technique which may be used for laser scanning a user's face are disclosed, for example, in U.S. Pat. No. 3,636,250, issued to Haeff on Jan. 18, 1972, the disclosure of which is hereby incorporated by reference. However, any available technique, including any high-speed, optical scanning technique or topographical mapping technique, may be used to determine the contours of a user's face 16.

FIGS. 10 through 12 show another embodiment of the diving mask 10 having a standard pair of hemispherically-shaped lenses 12 mounted on a contoured portion 46 of the mask 12. The contoured portion 46 is attached to the skirt portion 32 of the flexible gasket 14, as shown in FIGS. 11 and 12, with extension 48 of portion 46 engaging channel 58 formed by clevis arms 56 of the skirt portion 32 and edges or surfaces 50 and 52 of portion 46 being in contact with edges or surfaces 60 and 61 of skirt portion 32. The contoured portion 46 may be attached to the skirt portion 32 by force fitting, using adhesive, by fusion of the parts, or the like.

Edges or surfaces 50 and 52 of the contoured portion 46 are shaped to closely fit the contours of a user's face 16 using laser scanning or topographical mapping as discussed above. Contoured portion 46 may be made out of plastic, or any desirable material, and edges 50 and 52 may be cut, shaped, molded or otherwise formed to fit the contours of the user's face 16.

It is important to note that edges 50 and 52 and extension 48 of the contoured portion 46 may have any desirable configurations or shapes, and the configuration and shape of clevis arms 56 and channel 58 of the skirt portion 32 may also be varied or designed to provide any desirable joint between portions 32 and 46. The skirt portion 32 preferably has the elongated cavity 37, apertures 44 and flexible curved extensions 34 discussed above.

The standard pair of lenses 12 may be attached to the contoured portion 46 by engaging end or perimeter edge 62 of the lenses 12 in groove 54 provided in portion 46 by force fitting, using adhesive 64, by fusion of the parts, welding, or by any suitable fastening or clamping means. Also, the configuration or shape of end 62 and groove 54 may be varied to provide any desirable joint.

A majority of divers may use the above described diving mask 10 because the preferred exterior diameter of the lenses 12 has a range of from about 4.25 inches to about 9.0 inches, resulting in focusing distances of from about 4.5 inches to about 16.0 inches in front of the diving mask. Most divers will be able to focus their eyes within these distances. Therefore, most divers will be able to use the diving mask 10 without the need to use corrective lenses.

The different sizes of hemispherically-shaped lenses 12 yield different effective diopter values under water. Diopter, as is well known in the art, is a unit of measurement of the refractive power of lenses equal to the reciprocal of the focal length measured in meters. The following table lists the effective diopter values under water for different sizes of hemispherically-shaped lenses. For purposes of calculating the diopter values, the distance from the center of rotation 150 of a person's eye to the outer surface of the cornea was assumed to be 0.5 inch, the wall thickness of the lens 12 was assumed to be 0.075 inch, 1.34 was used for the index of refraction of salt water, and 1.586 was used for the index of refraction for the polycarbonate material which forms lenses 12.

| Exterior Dome Diameter | Effective Diopter Values Under Water |
| --- | --- |
| 3.0 | −7.934 |
| 3.5 | −6.628 |
| 4.0 | −5.690 |
| 4.5 | −4.985 |
| 5.0 | −4.435 |
| 5.5 | −3.995 |
| 6.0 | −3.634 |
| 6.5 | −3.333 |
| 7.0 | −3.077 |
| 7.5 | −2.859 |
| 8.0 | −2.669 |
| 8.5 | −2.503 |
| 9.0 | −2.356 |

As indicated in the above table, the preferred exterior diameter range of the lens 12 from about 4.25 inches to about 9.0 inches results in an effective negative diopter range under water of from about −5.3 to about −2.4. Effective negative diopter values for lenses with exterior diameter sizes below 4.25 increase significantly and at a much faster rate as the lenses get smaller. Therefore, most divers will not be able to use the smaller size of lenses (i.e., below 4.25 inches) without corrective lenses, because of the larger effective negative diopter values yielded by these smaller lenses under water. A majority of divers are represented by individuals who are under about 30 years of age and either have 20—20 vision or are near-sighted. These divers under 30 years of age have the ability to accommodate excessive negative diopter values because of the elasticity of the focusing parts (muscle, etc.) of their eyes. Therefore, a majority of divers will be able to accommodate the negative diopter range of lenses 12 having an exterior diameter range of from about 4.25 inches to about 9.0 inches. Although the elasticity of the focusing parts of an eye decreases with age, some older divers will also be able to accommodate excessive negative diopter values.

FIGS. 7 through 9 show yet another embodiment of the diving mask 10 for use with corrective lenses having a turning shaft 66 which slidably and rotatably engages a sleeve 68 mounted to the hemispherically-shaped lenses 12. The sleeve 68 engages a gasket 70 made out of a flexible material such as rubber, or the like, which is mounted in an aperture 72 in the lenses 12. Flanges 74 of the gasket 70 engage the lenses 12 providing a seal between the gasket 70 and lenses 12.

Flanges 76 of an upper portion 78 of the sleeve 68 bear against the gasket 70 helping to provide a seal. In addition, an O-ring seal 77 is provided in upper portion 78 as shown in FIG. 8. Also, an annular portion 80 at the inside cylindrical surface of the gasket 70 engages an annular groove 82 in the outer cylindrical surface of the sleeve, providing a further seal.

The rotating shaft 66 has a pin 84 attached to an upper portion 86 thereof which slidably engages an elongated slot 87 in the sleeve 68 so that the shaft 66 may be grasped by a knob 88 at the top of the shaft 66 and pulled upward. The shaft 66 also has a lower portion 90 which is connected to the upper portion 86 by a connecting member 92 having upper and lower balls 94 and 96, respectively, attached thereto. Upper ball 94 rotatably engages a spherically-shaped cavity 98 in the upper portion 86 of the shaft 66 so that a universal joint is provided and upper portion 86 is free to rotate about its longitudinal axis. Another pin 100 is attached to the lower portion 90 of the shaft 66. This pin 100 also slidably engages elongated slot 87 in the sleeve 68 which also allows the lower portion 90 of the shaft 66 to be moved upward by pulling upward on the knob 88.

Pin 100 also slidably engages elongated slots 102 in slotted arms 104. The slotted arms 104 are pivotally engaged at one end of each arm to pins 106 attached to lugs 108 at opposite slides of the sleeve 68. Elongated members 110 attached to a pair of retractable corrective lenses 112 are attached to the other ends of the slotted arms 104.

In order to position the corrective lenses 112 in a position in front of a user's eyes 24 as shown in FIG. 7, the lower portion 90 is allowed to drop toward the bottom of the sleeve 68 until the bottom surface 114 of the knob 88 comes into contact with the top 116 of upper portion 78 of the sleeve 68. Alternatively, the different parts may be sized so that downward movement of the shaft 66 is stopped when pin 100 comes into contact with the lower end 118 of slot 87 in the sleeve 68.

As the shaft 66 moves downward, the corrective lenses 112 rotate as indicated by arrow 120 in FIG. 7 as arms 104 pivot about pins 106 until the lenses 112 reach a position in front of a user's eyes as shown. If the user wishes to move the lenses 112 away from his or her eyes 24, this is accomplished by pulling upward on knob 88 which causes shaft 66 to move upward and the lenses 112 to rotate as arms 104 pivot about pins 106 as illustrated by arrow 122 shown in FIG. 9. When pin 84 reaches the top end 124 of slot 87, the user may simply rotate the upper portion 86 of shaft 66 by turning knob 88 until pin 84 engages horizontal slot 89 at the top end 124 of slot 87. The shaft 66 will then be held in place by pin 84 engaging slot 89 and the lenses 112 will be moved to a position above the user's eyes 24.

If the user wishes to lower the lenses 112 again to a position in front of his or her eyes 24, then knob 88 may be rotated so that pin 84 disengages from slot 89, and the lenses 112 may be lowered as described above.

Another embodiment of a shaft 182 is shown in FIGS. 18 and 19. The shaft 182 slidably engages a sleeve 178 mounted on the hemispherically-shaped lenses 12. The sleeve 178 engages gasket 70, which is mounted in aperture 72 in the lenses 12, as discussed above for the embodiment shown in FIGS. 7–9.

An elongated member 111, attached to a pair of retractable corrective lenses 112, passes through an aperture 188 in the shaft 182, near the lower end of the shaft 182. Member 111 may be welded to the shaft 182, or otherwise attached to shaft 182 by adhesive, or the like.

The sleeve 178 has an elongated slot 180 passing therethrough, which allows the corrective lenses 112 to be raised and lowered, by grasping knob 88 at the top of the shaft 182, and by pulling upward or pushing downward on the knob 88. Downward movement of the lenses 112 may be stopped by sizing the shaft 182 and sleeve 178 so that elongated member 111 comes into contact with lower end 186 of the slot 180, or bottom surface 114 of the knob 88 comes into contact with the top 116 of upper portion 78 of the sleeve 178.

The O-ring seal 77 holds the shaft 182 in place when the corrective lenses 112 are in an upward position, as illustrated by dashed lines in FIG. 18. Any other desirable means may be used to hold the shaft 178 in the upward position.

Figure 14:
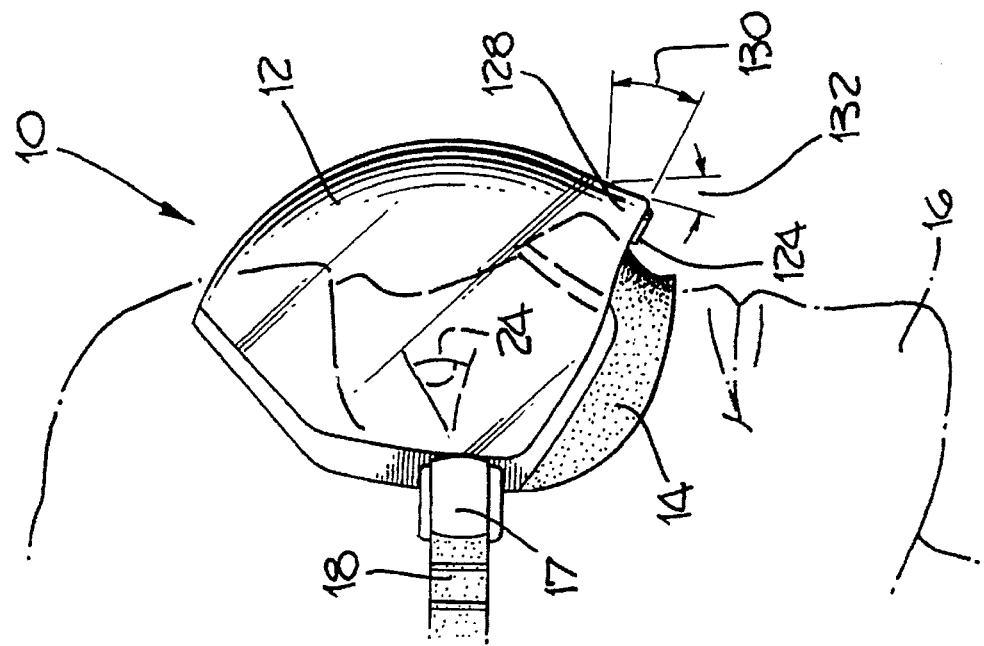
FIG. 14 is a side elevational view of the diving mask of FIG. 13.
Figure 13:
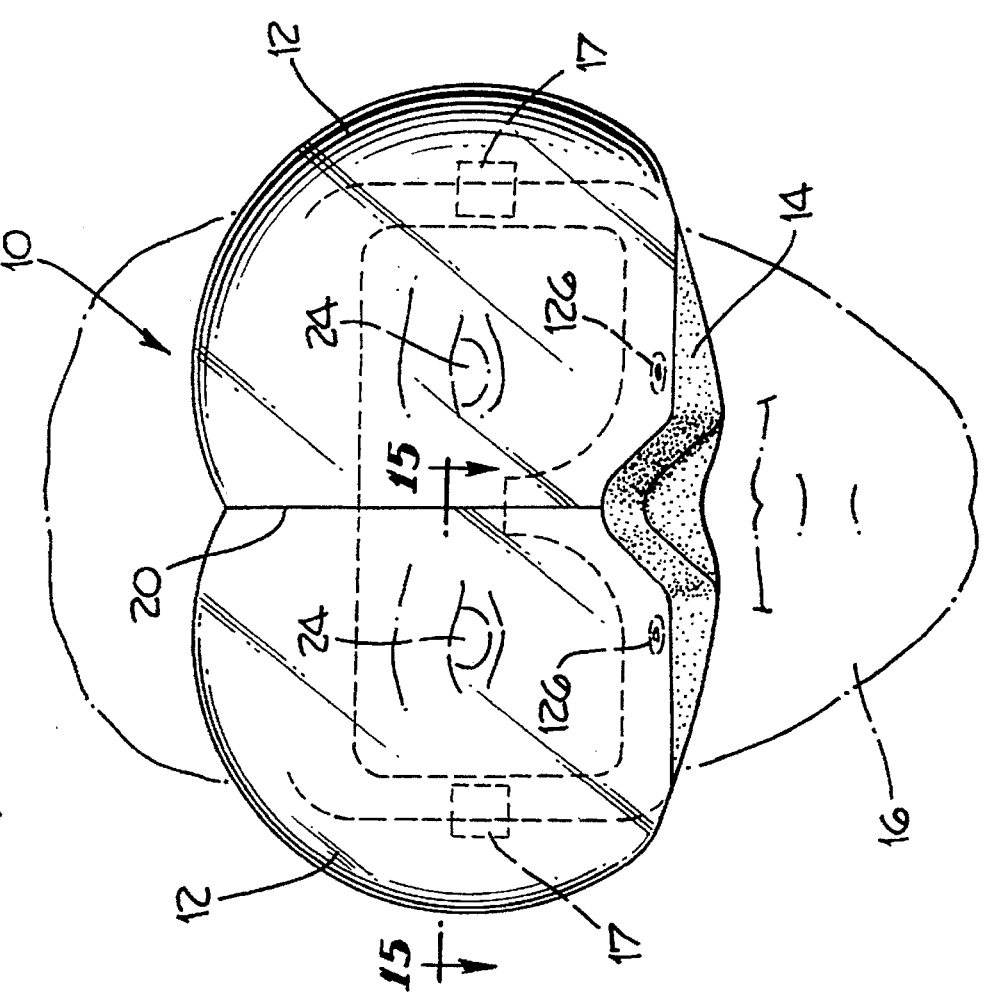
FIG. 13 is a front elevational view of another embodiment of the diving mask shown worn on the head of a user, having a pair of hemispherically-shaped lenses with purge valves therein mounted on the flexible gasket.
Figure 15:
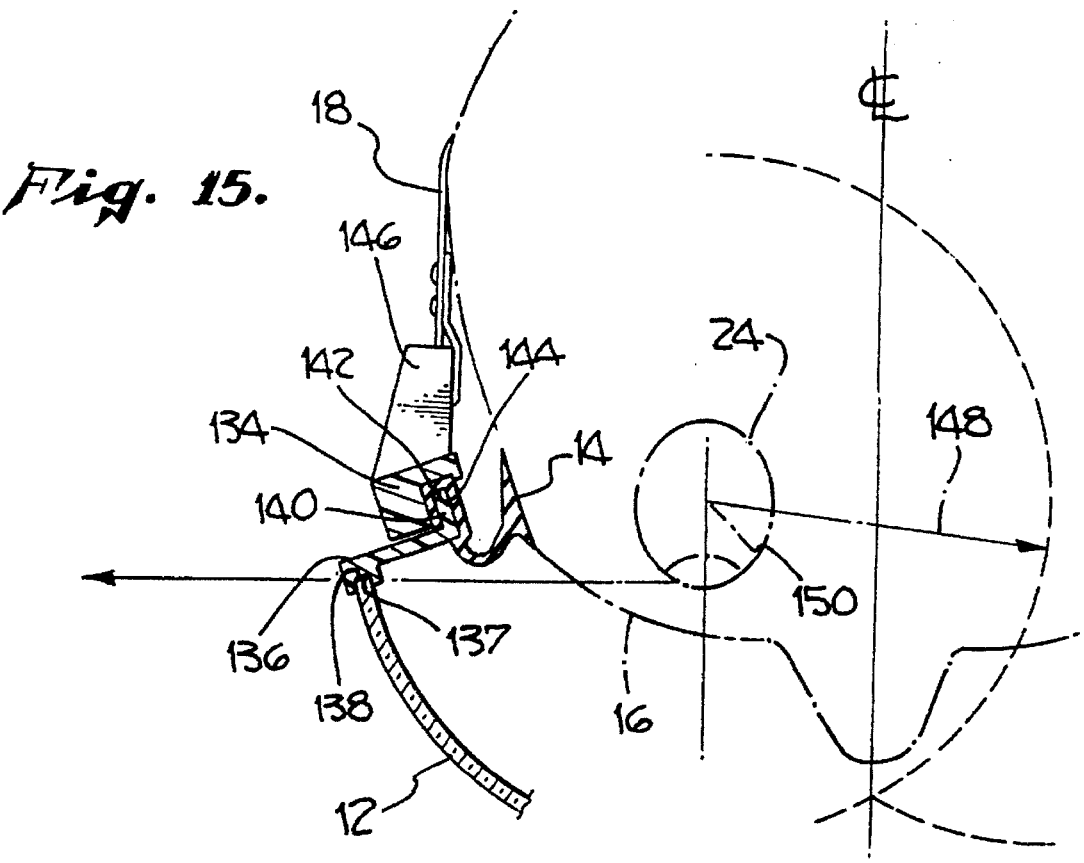
FIG. 15 is a partial cross-sectional view of the diving mask taken in the direction of arrows 15—15 shown in FIG. 13, illustrating how the hemispherically-shaped lenses may be connected to straps and the flexible gasket by a clamp and flange.

FIGS. 13 through 15 show another embodiment of the diving mask 10 having a pair of hemispherically-shaped lenses 12 with purge valves 126 therein mounted on the flexible gasket 14. A diver or user may expel or force any water inside the mask 10 through the purge valves 126 by exhaling through his or her nose. The purge valves 126 are designed to permit air or fluid to flow from inside the diving mask 10 to outside the mask 10, but do not permit such flow into the mask 10. Thus, water may be purged from inside the diving mask 10 through the valves 126 without allowing leakage into the mask 10. Any suitable purge valve 126 may be used such as the purge valve described in U.S. Pat. No. 4,856,120, issued to Hart on Aug. 15, 1989, the disclosure of which is hereby incorporated by reference thereto.

One or more purge valves 126 may be used for the diving mask 10. For example, one valve 126 may be used for each lens 12. Also, only one purge valve 126 may be used for the diving mask 10, and a diver may tilt his or her head back and forth to move water from the lens 12 without the valve 126 to the lens 12 with the valve 126 prior to purging the water from the mask 10.

Each of the lenses 12 having one of the purge valves 126 preferably has a collecting area 128 near the front and bottom of such lens 12 as shown in FIG. 14. The collecting area 128 is preferably formed as shown in FIG. 14, at angles 130 and 132 as measured from horizontal and vertical lines, respectively. Angle 130 preferably has a range of from about 30 degrees to about 90 degrees, and angle 132 may be any size up to about 60 degrees. However, angles 130 and 132 may vary as desired.

Water that has entered the lens 12 of the diving mask 10 past the flexible gasket 14 will move toward the bottom of the lens 12 and into the collecting area 128. Angles 130 and 132, help to prevent collected water from sloshing out of the collecting area 128. Also, the location of the purge valve 126 at the bottom of the collecting area 128 and angles 130 and 132 help to direct bubbles formed when water is exhausted out the valve 126 toward the back of the diving mask 10, away from the field of vision of a diver.

Angles 130 and 132 help to prevent water from sloshing or moving out of the collecting area 128 when a diver's head is in a vertical position as shown in FIG. 14, and when the diver is in a prone swimming position under water with his or her neck bent upward at approximately a 45 degree angle. If water trickles into the diving mask 10 while the diver is in a prone swimming position and looking downward, the diver may purge water trapped inside the mask 10 through valve 126 by moving his or her head and/or neck upward at approximately a 45 degree angle, and then exhaling through his or her nose to force water out of the mask 10 through valve 126.

FIG. 15 shows how the hemispherically-shaped lenses 12 may be connected to straps 18 and the flexible gasket 14 by a clamp 134 and alignment flange 136. The flange 136 may be molded or formed as an integral part of the lenses 12, or attached to ends or edges 138 of the lenses 12, which engage channel 137, as shown in FIG. 15, by adhesive, fusion, welding, or any suitable fastening means. The alignment flange 136 has extension 140. However, any suitable shape or configuration may be used for the flange 136. End portion 142 of the flexible gasket 14 is disposed in channel 144 of the clamp 134, folds around the extension 140, and is clamped between the flange 136 and extension 140. Clamp 134 may be attached to flange 136 by adhesive, welding, fasteners, or any suitable means. The straps 18 are attached to extensions 146 of the clamp 134.

As illustrated in FIG. 15, the lenses 12 are sized and mounted on the flexible gasket 14 so that the spherical center of curvature of each of the lenses 12 with a radius 148 substantially falls on, or coincides with, the center of rotation 150 of the corresponding eye 24 of a diver surrounded by the lens 12. The center of rotation 150 of a person's eye 24 is from about 0.5 inch to about 0.65 inch behind the front surface of the cornea. If the center of curvature of the lenses 12 substantially coincides with the center of rotation 150 of a diver's eyes 24, viewing distortion will be minimized when a diver's eyes 24 pan, tilt or rotate in their corresponding eye sockets.

It is the intention of this invention that any suitable means may be used to mount the lenses 12 on the flexible gasket 14 so that the center of curvature of the lenses 12 substantially coincides with the center of rotation 150 of the eyes 24 of a diver. As such, alignment of the centers of curvature and rotation may be achieved by fitting or forming the lenses 12 to match the contours of a diver's face 16, or a standard pair of lenses 12 may be mounted on a contoured portion of the mask 10 fitted or formed to match the contours of the diver's face 16, all as described in the above discussion. In addition, predetermined sizes may be selected for the flexible gasket 14, clamp 134 and flange 136 in order to mount different sizes of lenses 12 on the diving mask 10 so that the centers of curvature and rotation are aligned within an acceptable zone of misalignment, as discussed below.

Figure 16:
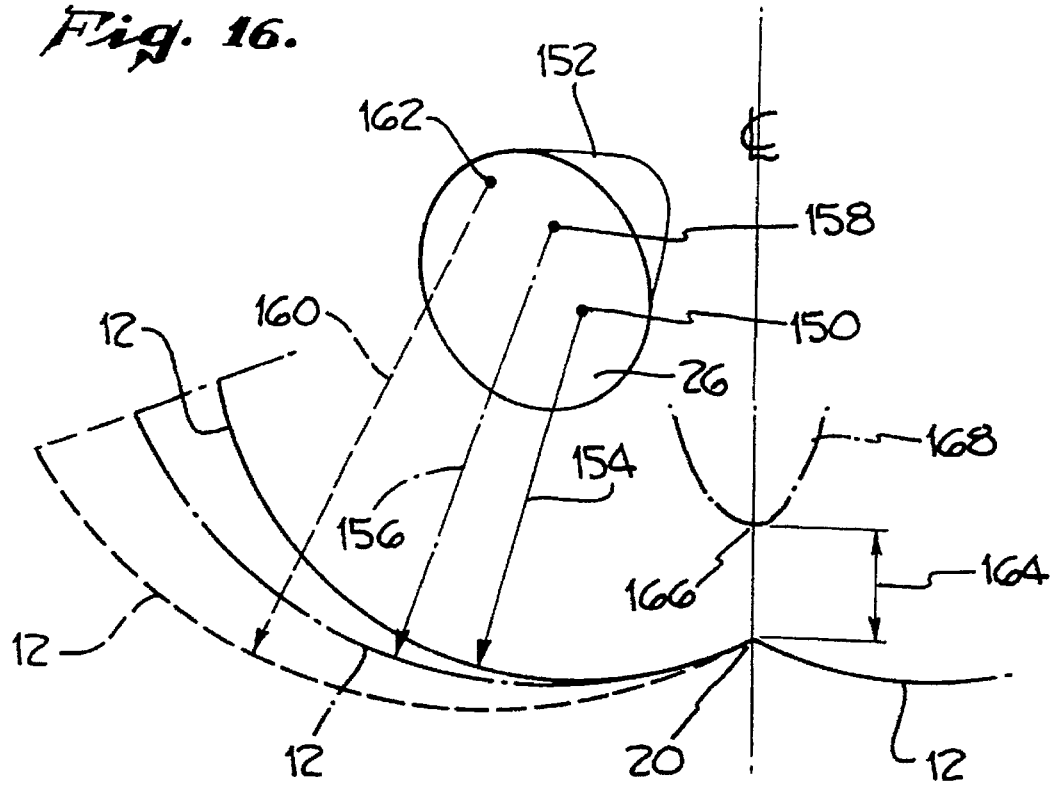
FIG. 16 is a schematic representation illustrating how the spherical center of curvature of each of the hemispherically-shaped lenses of FIG. 13 substantially coincides or aligns with the center of rotation of one of a user's eyes and falls within a predetermined acceptable zone of misalignment.

FIG. 16 is a schematic representation illustrating how the spherical center of curvature of each of the hemispherically-shaped lenses 12 of the present invention is intended to substantially coincide or align with the center of rotation 150 of a diver's eye 24, and falls within a predetermined acceptable zone of misalignment illustrated by region 152, which represents both horizontal and vertical misalignment.

The optical nodal point 26 of a diver's eyes 24 is the point at which the spherical center of curvature of the lenses 12 should align or coincide with if the eyes 24 do not pan, tilt or rotate in their eye sockets. The optical nodal point 26 is about 7 mm behind the front surface of the cornea of an eye. However, because a diver's eyes 24 move in their sockets, the spherical center of curvature of the lenses 12 should align or coincide with the center of rotation 150 of the diver's eyes 24 to achieve optimum vision through the lenses 12.

It is the intention of the present invention to substantially align the centers of curvature and rotation 15 in order to achieve improved vision through the hemispherically-shaped lenses 12 of the diving mask 10. Radius 154 shown in FIG. 16 represents a particular size lens 12 having a spherical center of curvature that coincides with the center of rotation 150 of an eye 24. Radii 156 and 160 represent two other sizes of lenses 12 having centers of curvature 158 and 162, respectively, that do not coincide exactly with the center of rotation of the eye 24. However, the centers of curvature 158 and 162 fall within the predetermined acceptable zone of misalignment of the present invention represented in FIG. 16 by the three dimensional region 152. "Substantially" coincides or aligns with, as used herein, means that the spherical center of curvature of a lens 12 falls within the predetermined acceptable zone of misalignment represented by region 152 so that improved vision is provided by the lens 12.

The two hemispherically-shaped lenses 12 are joined along edge 20. As a result, the distance 164 between edge 20 and the bridge 166 of a diver's nose 168 should be minimized to prevent vision distortion through the lenses 12 due to edge 20. Preferably, distance 164 has a range of from about 1 cm to about 50 cm.

The present invention will allow a majority of divers to use standard lenses 12 mounted on the diving mask 10 that have centers of spherical curvature that fall within the predetermined acceptable zone of misalignment or within region 152. However, larger diameter lenses 12 will provide a larger predetermined acceptable zone of misalignment than smaller diameter lenses 12. Therefore, for purposes of the present invention, the exterior diameter of the lenses 12 preferably has a range of from about 4.25 inches to about 9 inches.

FIG. 17 shows another embodiment of the diving mask 10 having a pair of hemispherically-shaped lenses 12 mounted on a peripheral flange 174 of a support portion 169 of the mask 10. The support portion 169 has a portion 170 that is clamped (by, e.g., clamp 134), or is otherwise fastened to the flexible gasket 14. Portion 169 also has another portion 171 which covers nose portion 22 of gasket 14 that fits around a user's nose, an upward nose portion 176 connected to portion 171, and portion 172 which connects peripheral flange 174 to portions 170 and 176.

The support portion 169 shown in FIG. 17 may be fabricated as an integral piece, such as by using molding techniques and plastic or other suitable material, or the various parts of portion 169 may be attached together. The support portion 14 may be used with selected sizes of lenses 12 and flexible gaskets 14, and designed so that the spherical center of curvature of each lens 12 substantially coincides with the optical nodal point of a user's eye, or with the center of rotation of a user's eye, or falls within a predetermined acceptable zone of misalignment, as described above. Also, purge valves 126 may be used in the support portion 169 of FIG. 17 and portion 169 may have a collecting area 128, like area 128 shown in FIG. 14.

It is intended that different sizes (or standard sizes) of flexible gaskets 14 may be selected and used with the lenses 12 and support 169, and different sizes (or standard sizes) of flexible gaskets 14 may be selected and used with the lenses 12 and support 169, so that the spherical center of curvature of each lens 12 substantially coincides with the optical nodal point of a user's eye, or with the center of rotation of a user's eye, or falls within a predetermined acceptable zone of misalignment, as described above.

It is important to note that the sizes of the flexible gasket 14, clamp 134 and flange 136 may be chosen to fit or accommodate any desirable size lens 12. Nearsighted divers may use smaller size lenses 12. If desired, the diving mask 10 of FIGS. 13 through 17 may be used with the corrective lenses of FIGS. 7 through 9, and 18. Any combination of features disclosed in this application may be used for the diving mask 10. The hemispherically-shaped lenses 12 of the diving mask 10 may be used with a full face mask, or a helmet which covers the head of a diver. Also, each lens of a diving mask may comprise only a small portion or segment of the hemispherically-shaped lens 12. Therefore, the lenses of a conventional mask may be replaced by such small portion of lens 12.

Figure 20:
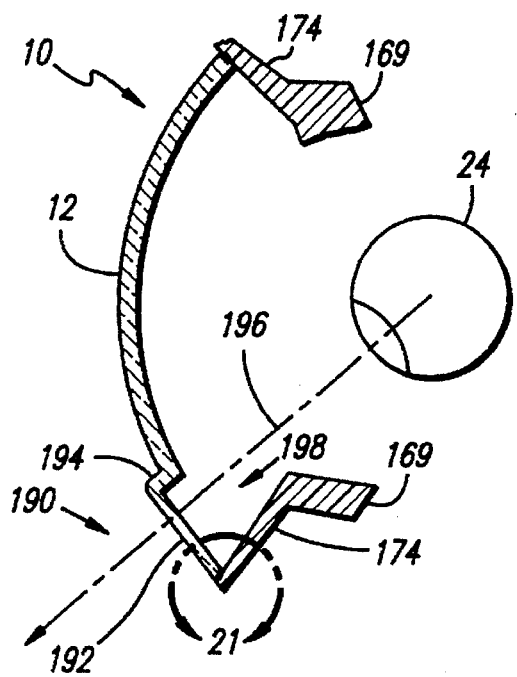
FIG. 20 is a partial cross-sectional view of another embodiment of the diving mask taken in the direction of FIG. 4, showing a hemispherically-shaped lens having a bottom lens at the bottom of the hemispherically-shaped lens.

FIG. 20 shows still another embodiment of the diving mask 10 having hemispherically-shaped lenses 12 mounted on the peripheral flange 174 of the support portion 169 of the mask 10. Preferably, each one of the lenses 12 has a bottom lens 190 at the bottom of the lens 12. The bottom lens 190 preferably is integrally formed (molded) as part of the lens 12. Alternatively, the diving mask 10 may be manufactured with only one of its two lenses 12 having the bottom lens 190.

The lens 190 shown in FIG. 20 is a flat or plano-plano lens 192. A flange portion 194 attaches the lens 190 to the larger lens 12, so that the flat surfaces of the lens 190 are perpendicular to a diver's line of sight represented by line 196 in FIG. 20. The lens 190 may extend any desirable distance or length along the bottom of the hemispherically-shaped lens 12. Also, if desired, the lens 190 may conform with the contour or shape of lens 12. For example, lens 190 may be a portion or section of a larger hemispherically-shaped lens.

The plano-plano flat lens 192 of FIG. 20 would provide a magnified image, or an image larger than the image seen through the hemispherically-shaped lens 12. As a result, presbyopic, or farsighted divers, who have difficulty focusing their eyes 24 close to the mask 10, may use the bottom lens 190 to inspect small objects held close to the mask 10 under water, which will magnify the size of the objects.

Locating the bottom lenses 190 at the bottom of the hemispherically-shaped lenses 12 forms a collecting area 198, which aids in draining water toward the purge valves 126. Furthermore, the collecting area 198 keeps water from flowing into the lenses 12 when a diver tilts his or her head in a downward direction in order to look straight down.

Figure 21:
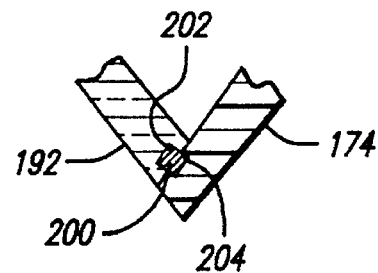
FIG. 21 is an enlarged detailed view taken as indicated by arrows 21—21 shown in FIG. 20, showing how an O-ring may be used to provide a seal between the bottom lens and a peripheral flange of a support portion of the mask.
Figure 22:
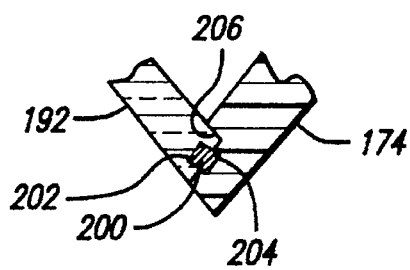
FIG. 22 is an enlarged detailed view taken like FIG. 1 showing another way of using an O-ring to provide a seal.

FIGS. 21 and 22 show how the bottom lens 190 may be mounted on the peripheral flange 174 using an O-ring seal 200 between the lens 190 and flange 174. An O-ring seal 200 may also be used at the top of the lens 12 between the lens 12 and flange 174. However, any type of suitable seal may be used in place of the O-ring seal 200. Channels or grooves 202 and 204 may be used in the lens 192 and flange 174, respectively, for the O-ring seal 200. If desired, channel 206 may be used in the flange 174 as shown in FIG. 22. The lens 12 and bottom lens 190 may be mounted to the peripheral flange 174 using any suitable clamping or fastening means. Alternatively, O-ring seals 200 may be omitted, and the lenses 12 and 190 may be attached to the flange 174 by adhesive, fusion of the parts, welding, or by any suitable means. Channels or grooves 202 and 204 may have any desirable shape or configuration such as rectangular, concave, etc.

Figure 24:
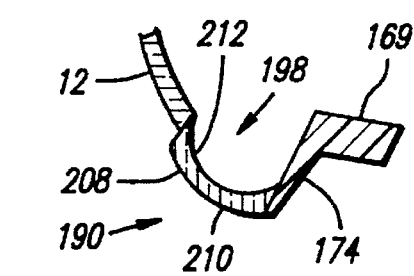
FIG. 24 is a partial cross-sectional view taken like FIG. 20 showing a convexo-concave bottom lens.
Figure 25:
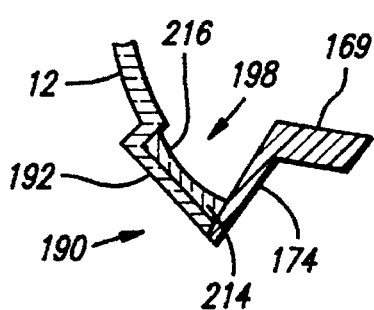
FIG. 25 is a partial cross-sectional view taken like FIG. 20 showing a plano-concave lens mounted inside a bottom lens.
Figure 30:
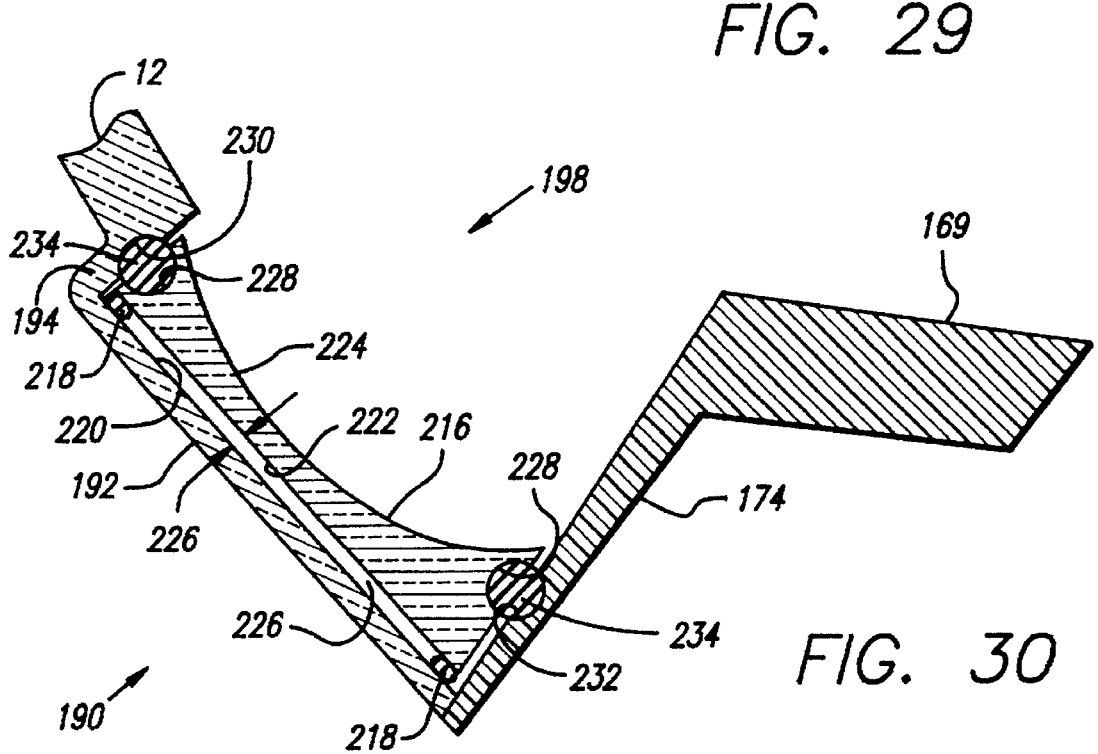
FIG. 30 is an enlarged detailed view of the bottom lens, with a plano-concave lens mounted therein, and of a peripheral flange and support portion of the mask, showing how O-rings may be used to mount the plano-concave lens inside the bottom lens.
Figure 28:
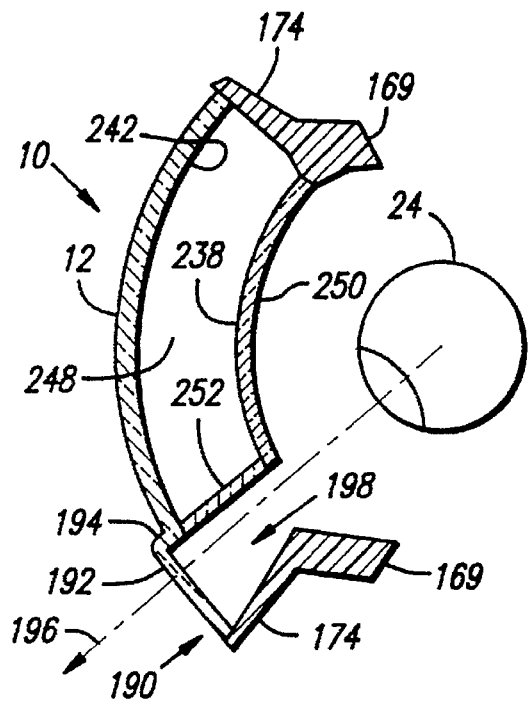
Figure 29:
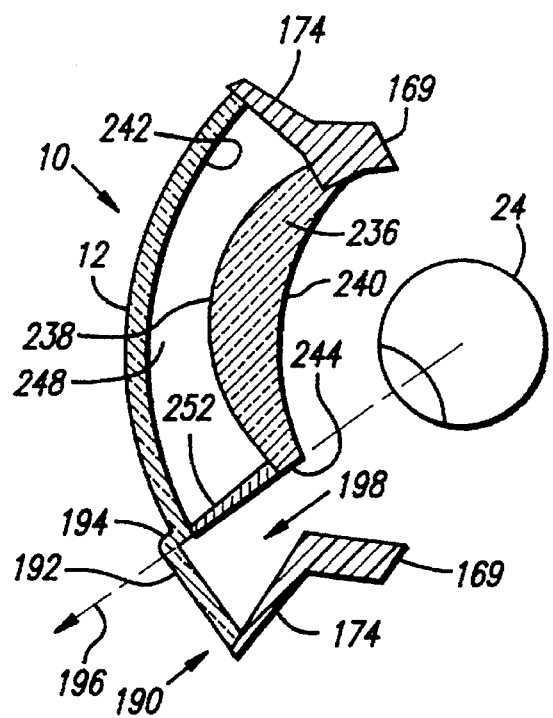
Figure 30:
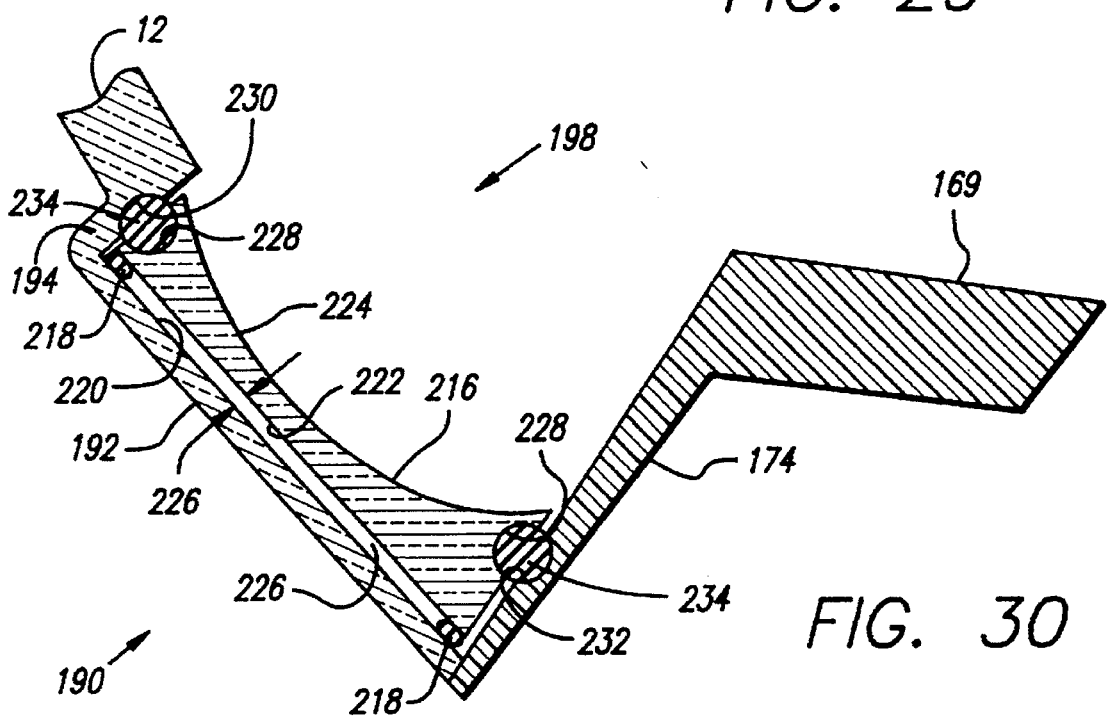

The diving mask 10 may also be manufactured with bottom lenses 190 which may be used by nearsighted divers. Three such bottom lenses 190 are shown in FIGS. 24, 25 and 30. In FIG. 24, a convexo-concave lens 208 has an inside concave surface 212 and an outside convex surface 210, which yield a negative diopter value. The lens 208 may be used by nearsighted divers to see clearly when in or out of the water. The lens 208 may be fastened to the lens 12 and peripheral flange 174 by adhesive, fusion of the parts, welding, clamping, or by any suitable fastening means. Alternatively, lens 208 may be integrally molded as part of lens 12.

The bottom lens 190 of FIG. 25 has a plano-plano flat lens 192 and a plano-concave lens 214 (having an inside concave surface 216) fastened to the flat lens 192. Any suitable means may be used to fasten the lenses 192 and 214 together, such as adhesive, fusion of the parts, welding, or the like. The combination of lenses 192 and 214 yields a negative diopter value, which allows nearsighted divers to see clearly through the lens 190 of FIG. 25 when the diving mask 10 is being worn above or below water.

Another bottom lens 190 used for the diving mask 10 is shown in FIG. 30 which allows different corrective lenses 216 with positive or negative diopter values to be removably installed in the bottom lens 190. Flat lens 192 has positioning portions 218 at its inside flat surface 220. Portions 218 may be molded as part of lens 192, or may be attached to surface 220. As such, portions 218 may be made out of a material such as plastic or glass, or a resilient material such as rubber, neoprene, silicone, or the like. Portions 218 are sized so that a gap or distance 226 will be maintained between surface 220 and flat surface 222 of lens 216, resulting in a trapped space 226 when lens 216 is installed in bottom lens 190. In order to allow excess fluid to escape as lens 216 is installed, portions 218 do not extend completely around or along channel 198.

Corrective lens 216 has a groove 228 which extends around the periphery or perimeter of the lens 216. Corresponding grooves 230 and 232 exist in flange portion 194 and peripheral flange 174, respectively. A seal 234 fits in grooves 228, 232 and 234, and is used to keep fluid in trapped space 226, when lens 216 is installed in bottom lens 19, as described below.

The bottom lens 190 design of FIG. 30 allows a diver to conveniently and quickly install lens 216 in order to yield a desirable positive or negative diopter value for the lens 190. A plano-concave lens 216 with concave surface 224 is shown in FIG. 30. However, any desirable type lens may be used for lens 216, such as plano-convex lens, etc.

Space 226 is filled with fluid prior to installation of lens 216 in order to avoid a trapped air space between lenses 192 and 216. Snapping lens 216 into place in bottom lens 190 with a trapped air space will cause problems, because air compresses as a diver descends under water, and expands as the diver ascends. As the air expands, this may cause lens 216 to unseat or come loose from bottom lens 190. Also, trapped air may condense during diving, causing moisture buildup on lenses 192 and 216, which may result in fogging. Also, Newton rings—or diffraction lines of interference—may occur due to differences in pressure, which could cause lenses 192 and 216 to contact each other, making it difficult to see through the bottom lens 190.

The above problems may be solved by installing the lens 216, for example, in a bucket of distilled water. A diver may simply use his or her fingers to push the corrective lens 216 into place in the bottom lens 190 so that seal 234 is engaged in grooves 228, 230 and 232, and the distilled water fills the space 226. Other suitable fluid may be used instead of the distilled water. The lens 216 may be removed from the bottom lens 190 using a suction-cup tool, and replaced with another lens 216.

Figure 23:
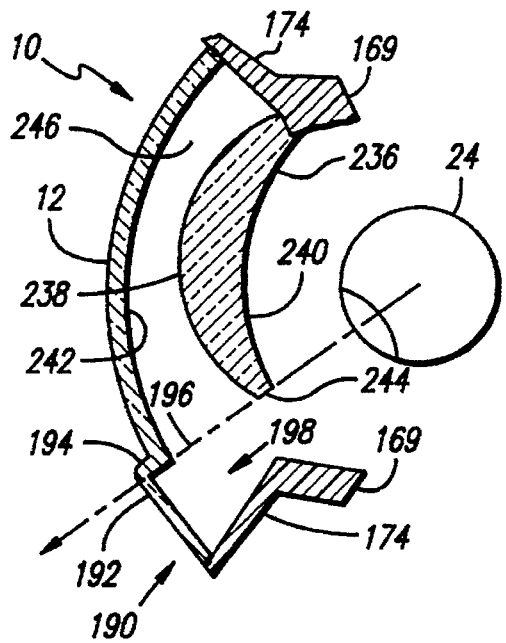
FIG. 23 is a partial cross-sectional view of another embodiment of the diving mask taken like FIG. 20, showing a hemispherically-shaped lens with a bottom lens and another lens mounted inside the mask.

FIG. 23 shows another embodiment of the diving mask 10, which may be used for farsighted or presbyopic divers. A convexo-concave lens 236 with a positive diopter value is mounted inside the mask 10 for each lens 12 to either the peripheral flange 174 or support portion 169, or to both these parts. Any suitable means may be used to mount the lens 236, such as adhesive, welding, fusion of the parts, clamping of the parts, etc. The lens 236 has convex and concave surfaces 238 and 240, respectively, and may have any desirable positive diopter value to meet the needs of a diver. A bottom lens 190 may be used with the mask 10. The bottom of lens 236 is cut off, molded, or formed at 244, as shown in FIG. 23, so that a diver's line of sight 196 through the bottom lens 190 is not obstructed by the lens 236.

A diver cannot see clearly above water through lenses 12 when wearing the diving mask 10 of FIG. 23 with positive diopter value lens 236. However, the plano-plano lens 192 or bottom lens 190 is a zero diopter lens above water, which allows a diver to see clearly through lens 190 above water.

Locating the bottom lenses 190 at the bottom of the hemispherically-shaped lens 12 provides significant advantages. Prior to jumping into the water from a boat, a diver must be able to glance down to ensure that no obstacles or other divers are in the way. While wearing the diving mask 10, a diver may easily look downward through the bottom lenses 190 prior to jumping into the water. Also, while floating upright in the water and looking toward a boat or the shore, a diver typically tilts his or her head in a backward direction to keep water out of his or her mouth. Clear vision is provided through the bottom lenses 190 of the diving mask 10 while the diver tilts his or her head backward.

Water which has seeped into the diving mask 10 may enter air space 246 between convex surface 238 of lens 236 and inside surface 242 of the hemispherically-shaped lens 12. As a result, water droplets may form on surfaces 238 and 242, causing optical distortion through the lenses 12 and 236.

Figure 29:
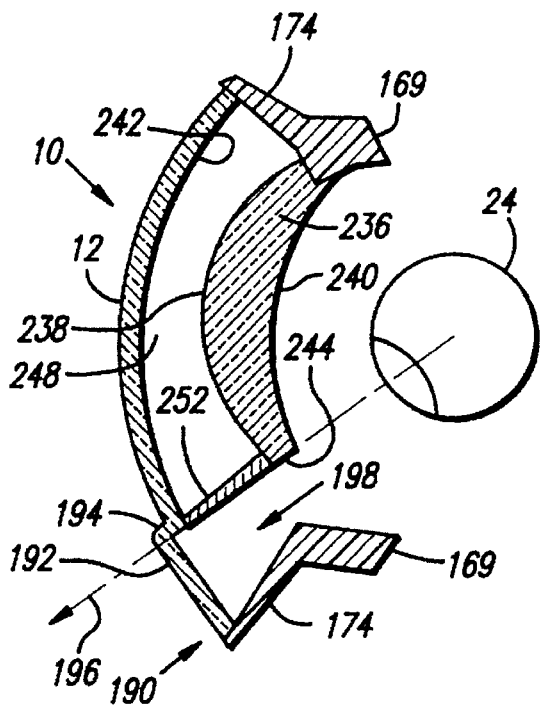
FIG. 29 is a partial cross-sectional view of another embodiment of the diving mask taken like FIG. 20, showing a hemispherically-shaped lens with a bottom lens, and another convexo-concave lens mounted inside the mask in order to provide a trapped dry-air space or volume inside the mask.

This problem is solved by the embodiment of the diving mask 10 shown in FIG. 29, having a member 252 attached to each lens 236 near end 244 and to the lens 12 near flange portion 194, so as to not obstruct a diver's line of sight through bottom lens 190. Member 252, lens 236 and lens 12 form a trapped dry-air space 248 inside the diving mask 10. As a result, water is not allowed to enter space 248, preventing moisture droplets from forming on surfaces 238 and 242 and distorting the diver's vision.

The trapped dry-air space 248 provides important advantages. Space 248 causes the diving mask 10 to float, aiding retrieval of the mask when dropped or separated from a diver. As a result of the trapped dry-air space 248, the internal air volume of the diving mask 10 is reduced, making it easier for a diver to clear the mask 10 of water that has seeped into the mask 10. Also, dry-air space 248 reduces the amount of air volume required to compensate for hyperbaric pressure when descending under water.

Figure 28:
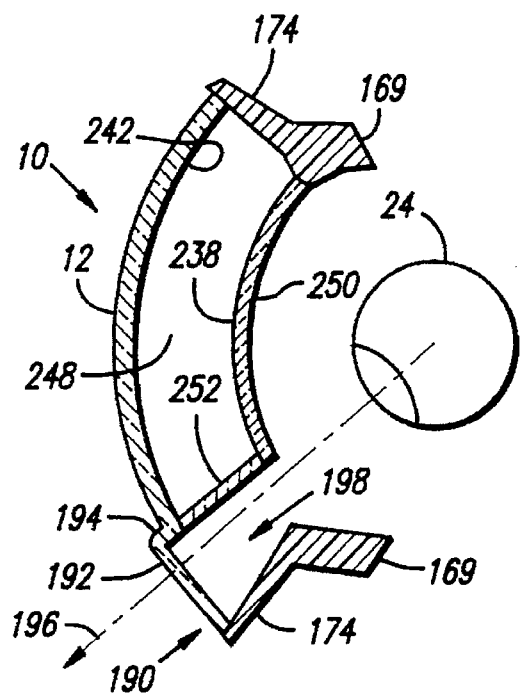
FIG. 28 is a partial cross-sectional view of another embodiment of the diving mask taken like FIG. 20, showing a hemispherically-shaped lens with a bottom lens, and another lens of uniform thickness mounted inside the mask in order to provide a trapped dry-air space or volume inside the mask.

FIG. 28 shows yet another embodiment of the diving mask 10 having a transparent wall 250 of uniform thickness, which forms trapped dry-air space 248. Member 252 is attached to member 250 and to lens 12 near flange portion 194. Wall 250 is used for each lens 12, and may be used to support a positive diopter lens (not shown), which may be attached to wall 250 using any suitable means such as adhesive, fusion of parts, clamping, welding, or the like.

Note that the bottom lenses 190 of FIGS. 23 through 25 and 28 through 30 have collecting areas 198.

As shown in FIG. 26, the ends 253 of the hemispherically-shaped lenses 12 may be formed or curved toward a diver's head. Ends 253 decrease the external dimensions of the diving mask 10, reducing the internal trapped-air volume of the mask 10. Formed ends 253 will only create minor distortion of vision in the most extreme 10 degree angle of view.

Another embodiment of the diving mask 10 is shown in FIG. 27. This embodiment has a translucent baffle 251 attached near edge 20 where the hemispherically-shaped lenses 12 are joined. The baffle 251 is positioned parallel to a straight-ahead field-of-view through the mask 10. The sides of the baffle 251 may be textured as represented by numeral 254, or may be coated by any suitable material, which will provide a translucent baffle that allows light to pass through the baffle, but not the detail of an image. The translucent baffle 251 prevents double vision which occurs in the centermost stereoscopic field of view when large size lenses 12 are used, and when the left eye 24 sees through the right lens 12, and the right eye 24 sees through the left lens 12.

A vast majority of divers currently wear contact lenses when using their diving masks under water. There is a need for a diving mask 10 that can be used to provide improved viewing characteristics under water, and may be used by divers under water while wearing contact lenses which correct eyesight above water. Such a mask 10 could be used by both a diver who does not need contacts or eyeglasses, or by a diver who needs corrective lenses to see clearly above water.

Figure 31:
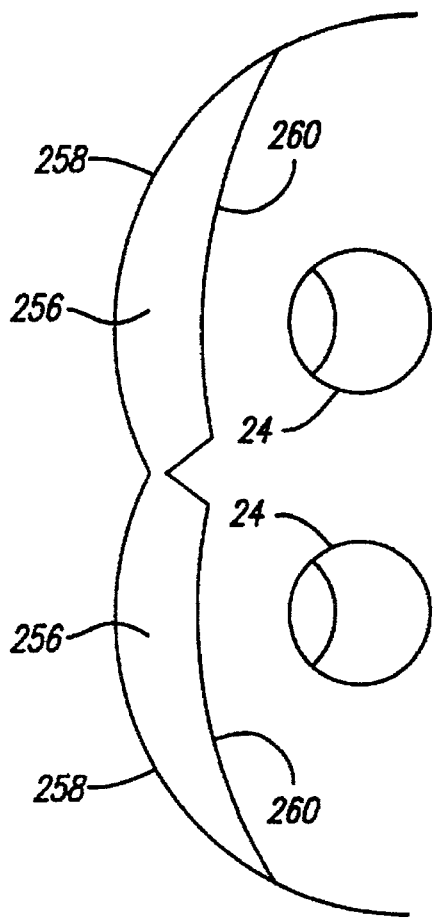
FIG. 31 is a schematic representation of two hemispherically-shaped meniscus lenses of another embodiment of the diving mask having different outer and inner curvatures, each lens having spherical centers of curvature of its outer and inner surfaces that are coplanar, or that fall on a plane passing through the center of the eye of a user.
Figure 32:
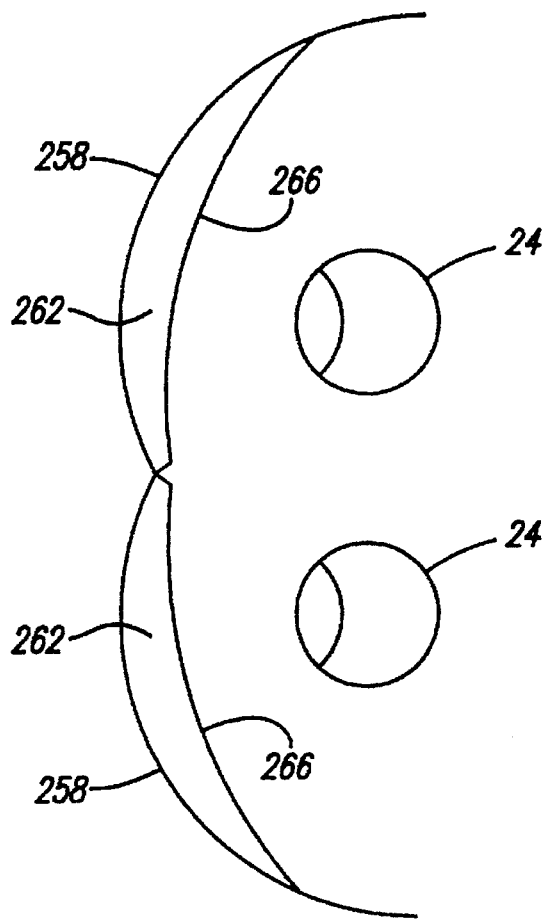
FIG. 32 is a schematic representation of two hemispherically-shaped meniscus lenses of another embodiment of the diving mask having different outer and inner curvatures, each lens having spherical centers of curvature of its outer and inner surfaces that are not coplanar.

FIG. 31 schematically represents two generally hemispherically-shaped meniscus lenses 256 used for another embodiment of the diving mask 10, which would allow divers with 20—20 vision and divers wearing contact lenses to see clearly under water. Each lens 256 has outer and inner surfaces 258 and 260, respectively, having different curvatures. A schematic representation of two other generally hemispherically-shaped meniscus lenses 262 used for still another embodiment of the diving mask 10 is shown in FIG. 32. Each lens 262 also has outer and inner surfaces 258 and 266, respectively, having different curvatures. Note that lenses 256 and 262 have the same outside surfaces 258. The lenses 262 may also be used in a diving mask 10, which can be used under water by divers with 20—20 vision and divers wearing contact lenses.

The curvatures of outer surface 258 and inner surfaces 260 and 266 of the lenses 256 and 262 are sized to yield an effective zero diopter value under water. As a result, a diver with 20—20 vision, or vision corrected by contact lenses, may then use the diving mask 10 to see clearly under water. Lenses 256 and 262 are designed by first selecting an outer surface 258 of a particular curvature, and then varying the curvature of the inner surfaces 260 and 266 to yield lenses 256 and 262 having a zero diopter value under water.

Figure 34:
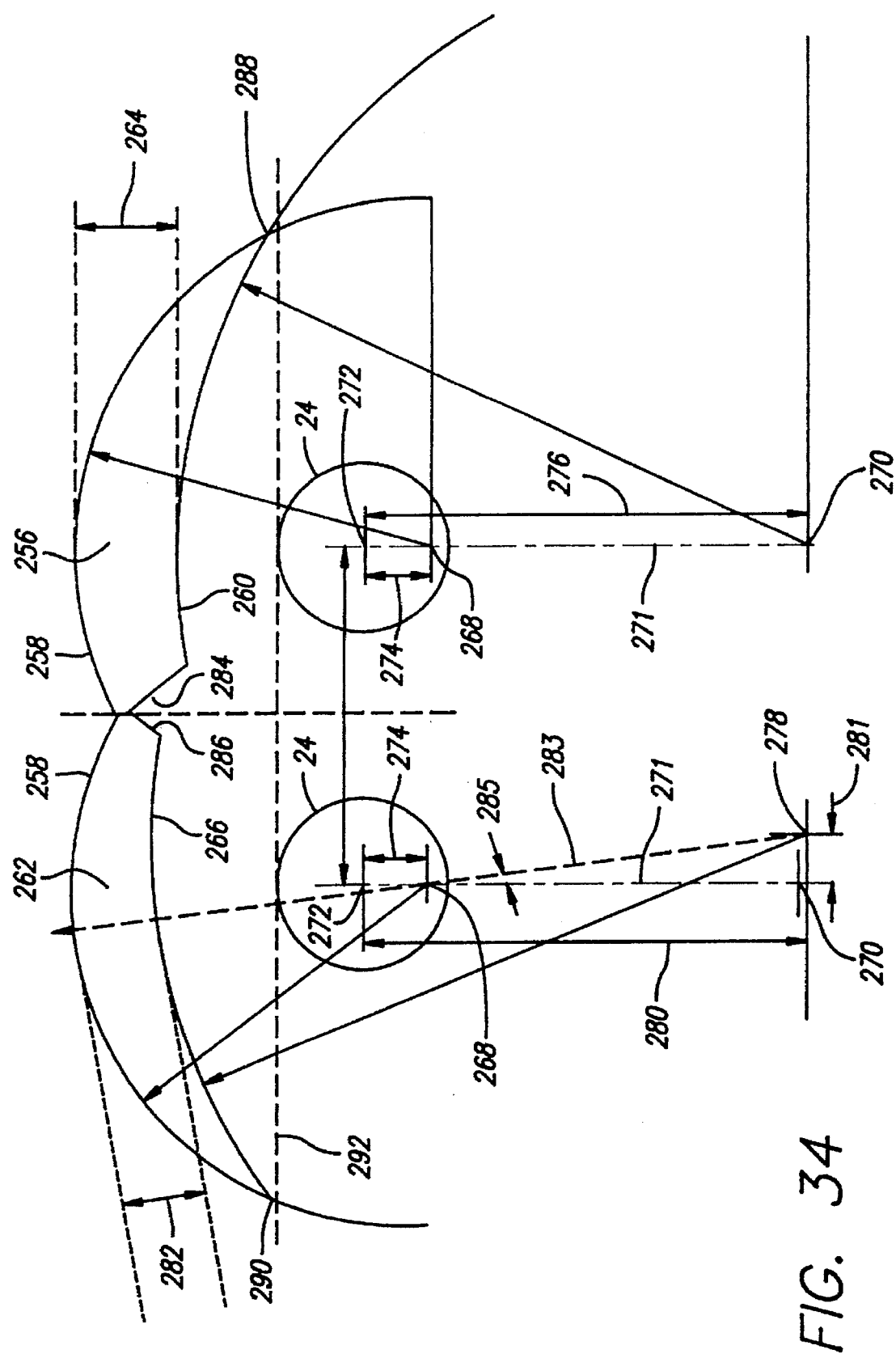
FIG. 34 is a schematic representation of two different hemispherically-shaped meniscus lenses, illustrating the differences between a lens having spherical centers of curvature that are coplanar and a lens having spherical centers of curvature that are not coplanar.
Figure 35:
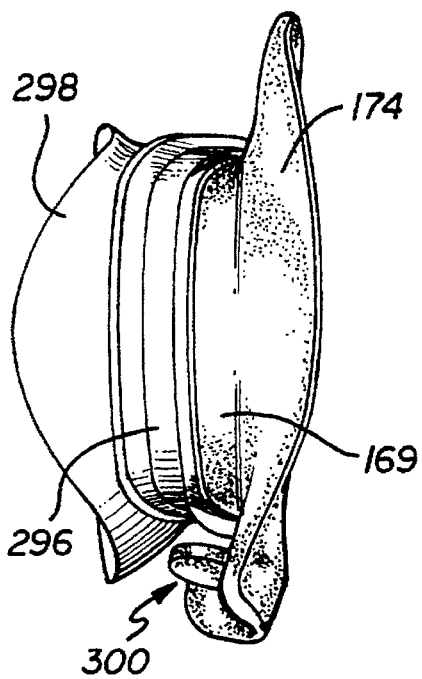
FIG. 35 is a side elevational view of a support portion, perimeter clamp and conventional flexible face seal of another embodiment of the diving mask, the support portion having a peripheral flange for mounting a pair of hemispherically-shaped lenses, and two integral housings for mounting purge valves.

FIG. 34 is a schematic representation of meniscus lenses 256 and 262. The spherical centers of curvature 268 and 270 of the outer and inner surfaces 258 and 260, respectively, of lens 256 are coplanar, or fall on a plane 271 passing through the center 272 of a diver's eye 24. For practical purposes, the center of an eye 24 may be considered to be the center of rotation 150 of the eye 24. Also, the spherical centers of curvature 268 and 270 are located distances 274 and 276, respectively, behind the center 272 of eye 24. As a result, lens 256 is located closer to a diver's face 16. This effectively reduces the trapped air volume inside the diving mask 10 and the size of the mask 10.

The spherical centers of curvature 268 and 278 of the outer and inner surfaces 258 and 266, respectively, of lens 262 are not coplanar, or do not fall on a plane 271 passing through the center 272 of a diver's eye 24. The spherical center of curvature 278 of inner surface 266 is located a distance 180 behind the center 272 of eye 24. Also, note that spherical center of curvature 278 of inner surface 266 is offset a distance 281 from center of curvature 270 of the inner surface 260, such that line 283, passing through centers 268 and 278 forms an angle 285 with line 271. Preferably, angle 285 has a range of from about zero degrees to about 15 degrees. However, angle 285 may have any desired value.

Surfaces 284 and 286 of lenses 256 and 262, respectively, may be textured or coated with any suitable material to provide a translucent effect in order to prevent double vision, as explained above.

Meniscus lens 256 has a thickness 264 that is larger than the maximum thickness 282 of meniscus lens 262. As a result, lens 262 is lighter than lens 256. The curvature of inside surface 266 of lens 262 causes a slight degree of coma, or a slight distortion where a fringe is produced, for peripheral vision. However, such coma effect is so minimal to almost be imperceptible.

For an outer surface 258 diameter of 5.5 inches, the thickness 264 of lens 256 is about 20 mm, and the thickness of lens 262 is about 16.3 mm. The radius of inner surface 260 is about 120 mm, and the radius of inner surface 266 is about 126 mm.

The main curvatures of surfaces 260 and 266 are also chosen (designed) so that the lenses 256 and 262 provide increased peripheral vision. Note in FIG. 34 that the intersection of outer surface 258 and inner surface 260 of lens 256 at 288 is slightly above a line 292 passing in front of the eyes 24 (or corneas) of a diver. Also, the intersection of outer surface 258 and inner surface 266 of lens 262 at 290 approximately falls on line 290, providing optimal peripheral vision. It is the intention of the invention to provide increased peripheral vision for the diving mask 10. The lenses 256 and 262 preferably provide in-focus peripheral vision in a range of from about 90 degrees to about 180 degrees.

It is the intention of this invention to provide a diving mask 10 using the meniscus lens 256 or 262, which furnishes optimal peripheral vision and decreased trapped air space inside the mask, while still furnishing clearances for a diver's face. The meniscus lenses 256 and 262 described above, having an outside surface 258 with a 5.5 inch diameter furnishes the above-mentioned advantages.

Figure 33:
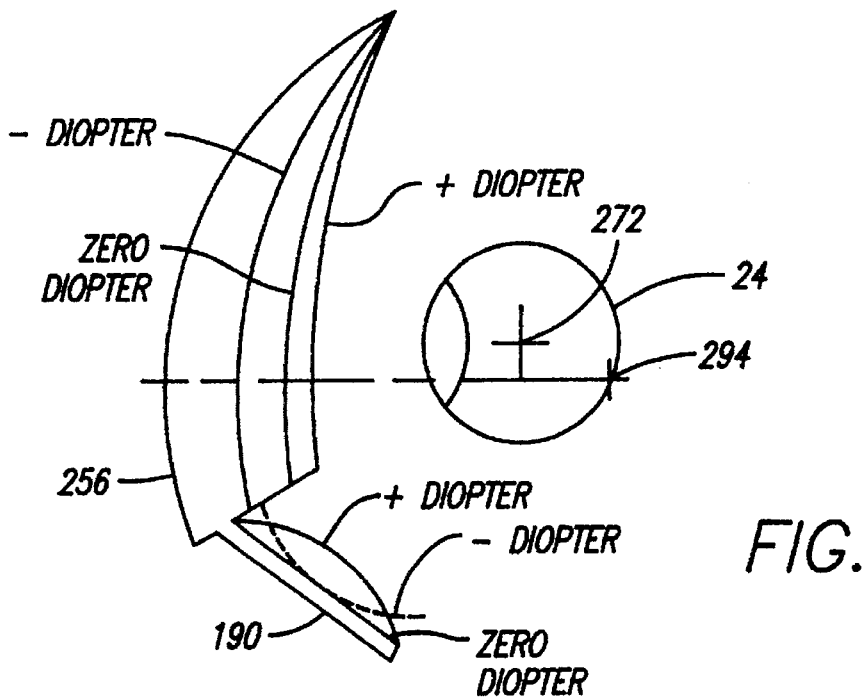
FIG. 33 is a schematic representation of a hemispherically-shaped meniscus lens having a bottom lens, which illustrates how changes in the effective diopter value of the meniscus lens can be matched with the type of bottom lens used for the diving mask, and illustrates how the spherical centers of curvature of the outer and inner surfaces of the meniscus lenses are located below the center of a diver's eye.

FIG. 33 schematically illustrates how changes in the effective diopter value of the meniscus lens 256 (or 262) can be matched with the type of bottom lens 190 used for the diving mask 10. For a meniscus lens 256 yielding a zero diopter value under water, a plano-plano bottom lens 290 would be needed. For a meniscus lens 256 having a positive diopter value under water, a plano-convex bottom lens 190 would be used for the diving mask 10. A plano-concave bottom lens 190 would be required for a meniscus lens 256 yielding a negative diopter value under water.

The lenses 256 and 262 are designed so that the centers of spherical curvature 294 of the outside and inside surfaces 258, 260 and 266 of the lenses are located below the centers 272 of a diver's eye 24, when the lenses are viewed vertically as shown in FIG. 33. Center 294 represents either of the centers 268, 270 and 278 shown in FIG. 34. Locating center 294 below center 272 of the eye results in reduced weight for the lenses 256 and 262 because the thicker portion of the lenses is located near the bottom lens 190, and is reduced in size to form bottom lens 190. Also, as discussed below, drainage is improved due to locating center 294 below the center 272 of the eye 24.

FIGS. 35 through 38 show a support portion 169, perimeter clamp 296 and conventional flexible face seal 298 of another embodiment of the diving mask 10. The support portion has a peripheral flange 174 for mounting a pair of hemispherically-shaped lenses 12 (which may be meniscus lenses), and two integral housings 300 used for mounting purge valve 126 (see FIG. 38).

Figure 36:
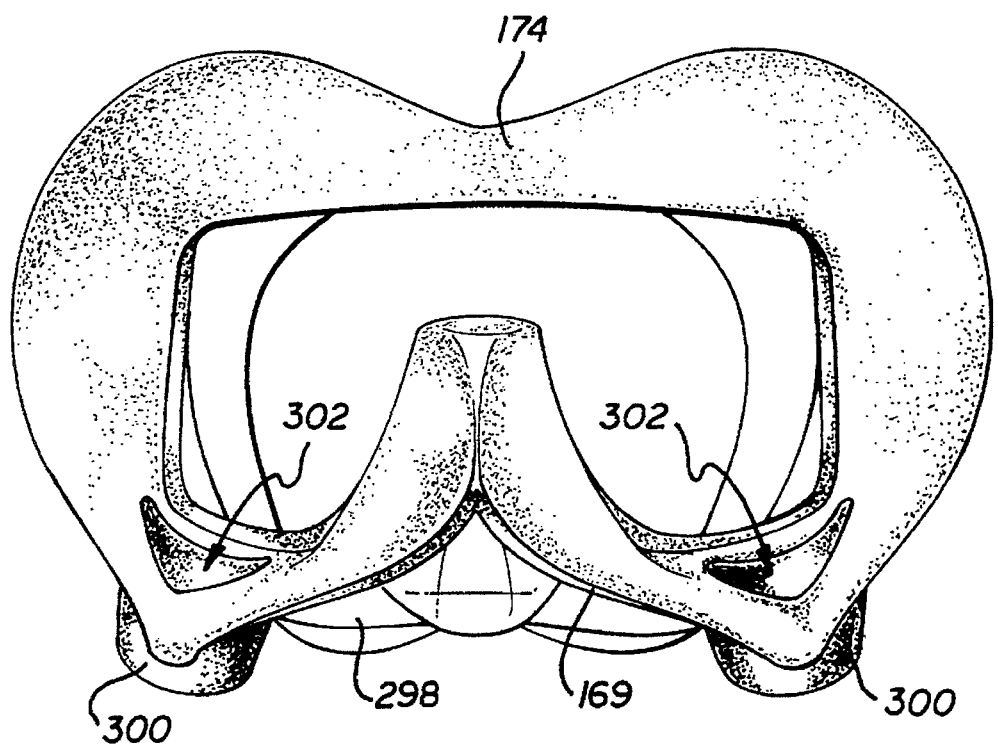
FIG. 36 is a front elevational view, showing the support portion and flexible face seal of FIG. 35.
Figure 37:
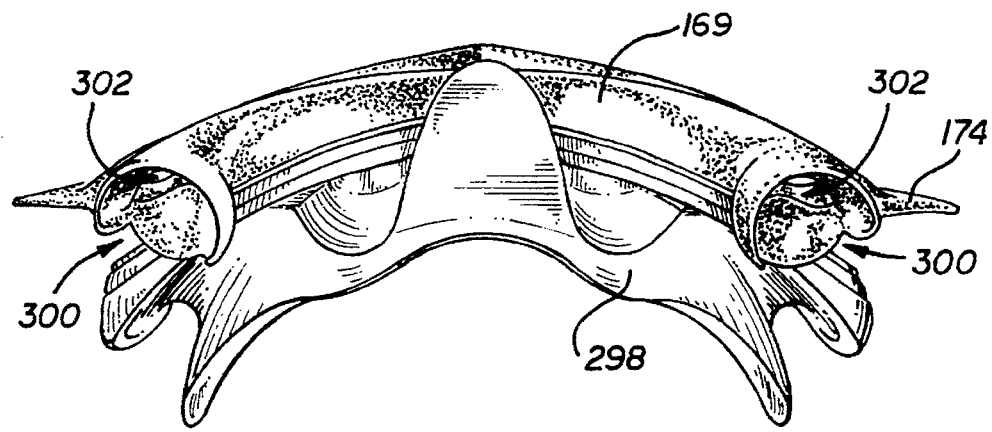
FIG. 37 is a bottom plan view of the support portion, perimeter clamp and flexible face seal of FIG. 35.
Figure 39:
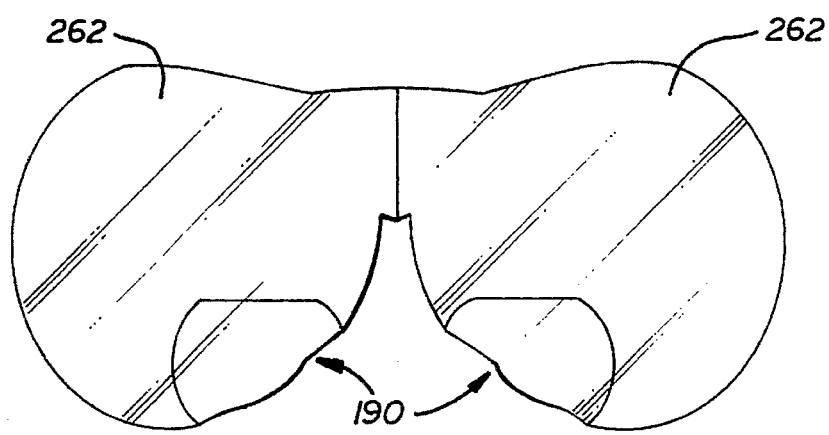
FIG. 39 is a front elevational view of two generally hemispherically-shaped meniscus lenses of the diving mask.
Figure 40:
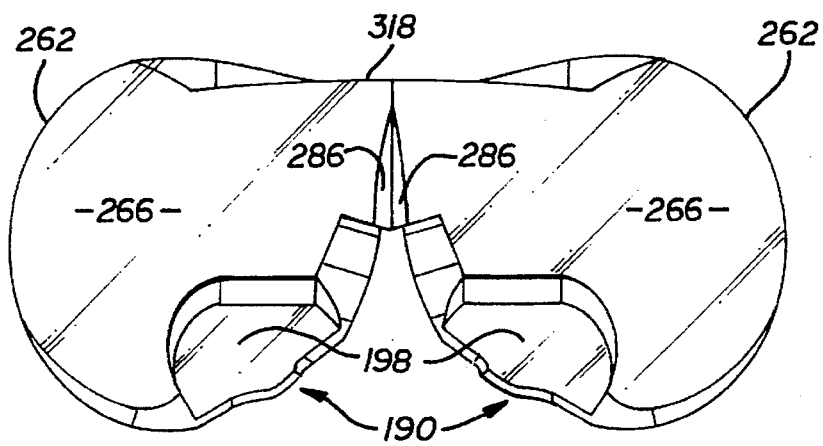
FIG. 40 is a rear elevational view of the meniscus lenses of FIG. 39.
Figure 38:
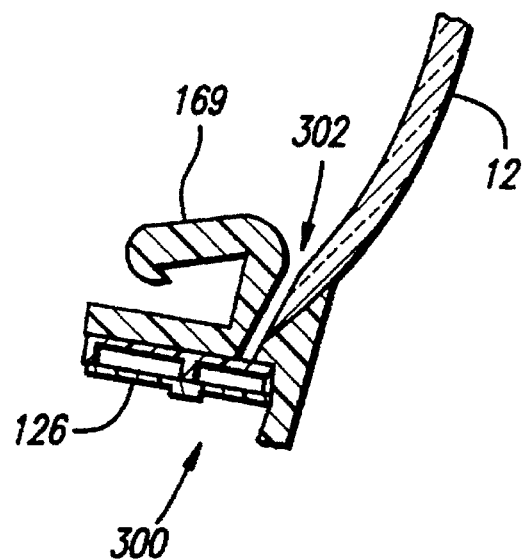
FIG. 38 is an enlarged cross-sectional view of a part of the support portion of FIG. 5 and of one of the housings of the support portion, showing a purge valve mounted in the housing, and a hemispherically-shaped lens mounted on the support portion.

As best shown in FIGS. 36 and 38, an opening 302 is formed in support portion 169 which allows water to drain from inside the mask 10 through purge valve 126. A diver may exhale, forcing the water through opening 302 and out of the mask through purge valve 126. The purge valve 126 is angled to direct air bubbles away from the diver's field of view toward the back of the mask 10. The support portion 169 has one integral housing 300 for each lens 12, i.e., two purge valves are used with the mask as shown in FIGS. 36 and 37.

Figure 45:
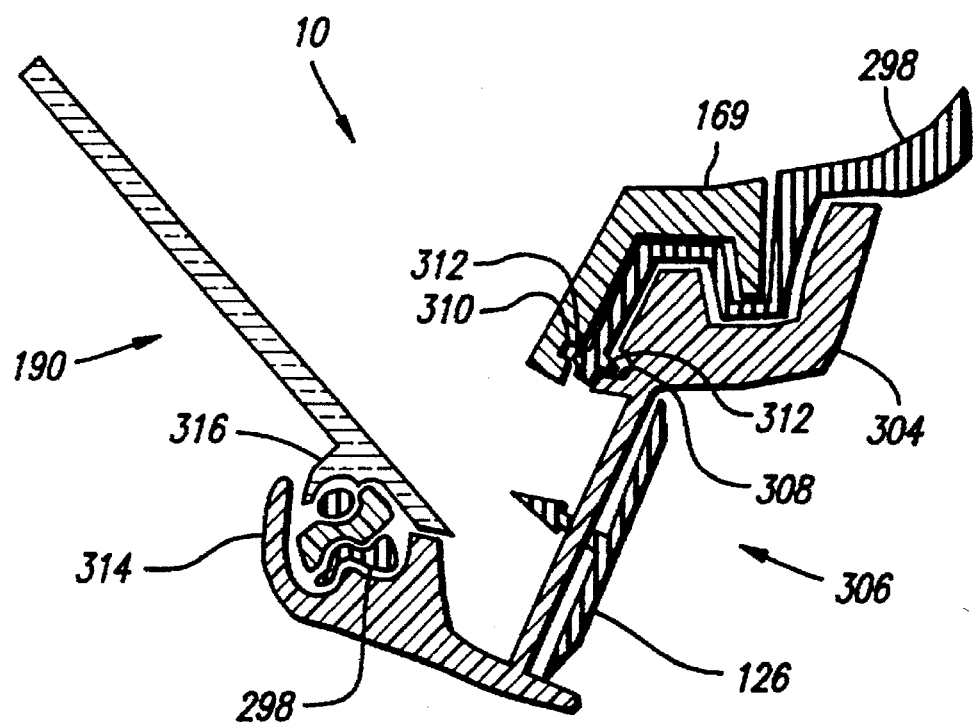
FIG. 45 is an exploded cross-sectional view of another embodiment of the diving mask taken across a perimeter clamp, flexible face seal, support portion and bottom lens, showing a housing in the clamp for mounting a purge valve.
Figure 41:
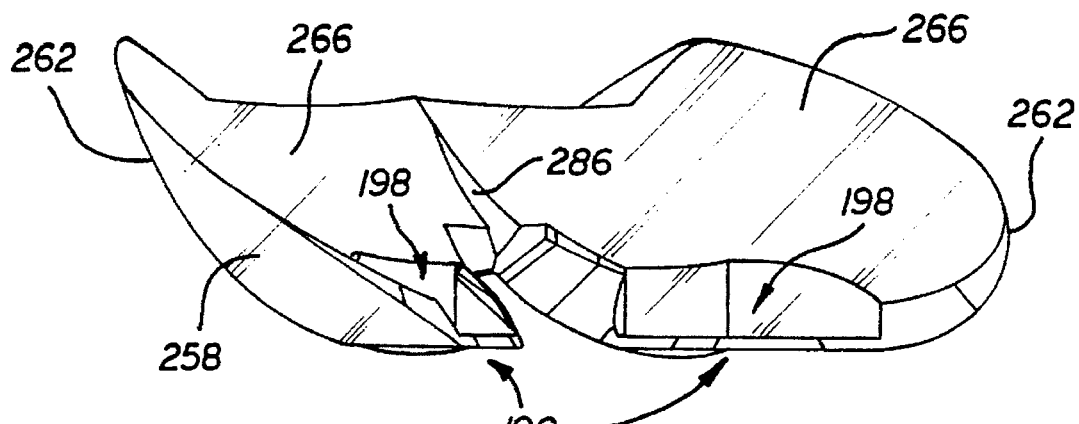
FIG. 41 is a rear perspective view of the meniscus lenses of FIG. 39.
Figure 42:
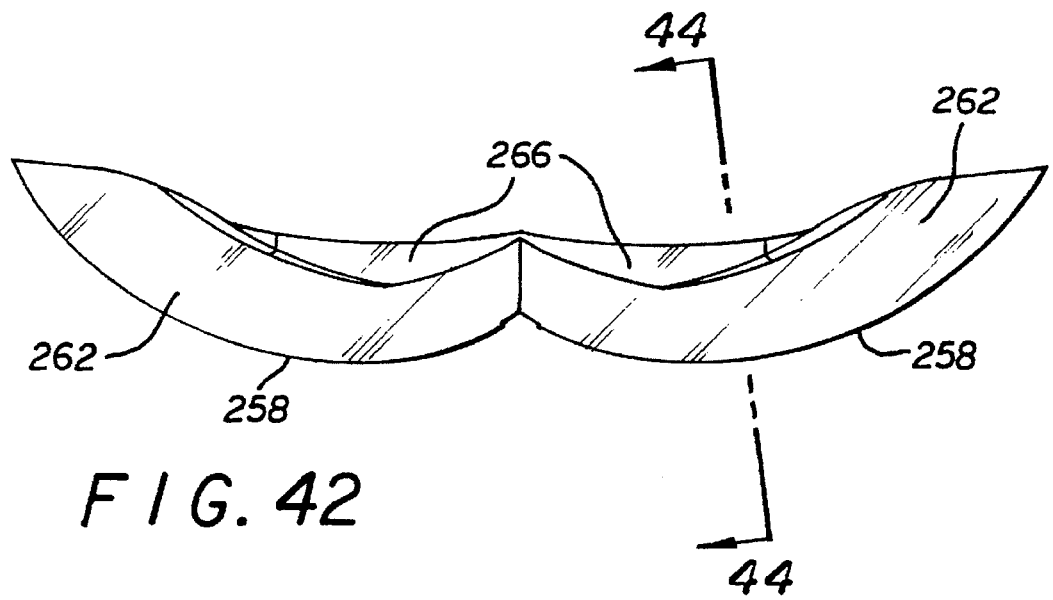
FIG. 42 is a top plan view of the meniscus lenses of FIG. 30.
Figure 43:
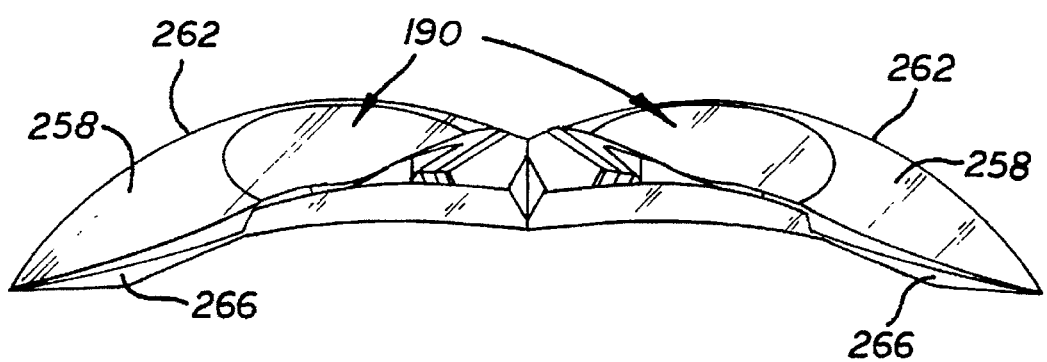
FIG. 43 is a bottom plan view of the meniscus lenses of FIG. 39.

FIG. 45 shows another embodiment of the diving mask 10 using a perimeter clamp 304 having integral housings 306 formed in the clamp for the purpose of mounting purge valves 126. The perimeter clamp 296 serves the dual functions of mounting the face seal 298 to the support portion 169, and mounting the lenses 12, including the bottom lenses 190, to the support portion.

The perimeter clamp 296 may be a bezel clamp and is used to clamp the face seal 298 to the support portion 169. The perimeter clamp 304 and support portion 169 have grooves 308 and 310, respectively, which engage extensions 312 integrally formed in the face seal 298. As shown in FIG. 45, the support portion 169, face seal 298, and perimeter clamp 304 are generally formed to engage each other. These parts can be formed in any desirable manner in order to engage each other. Preferably, clamp 304 has a flange portion 314 which engages a flange portion 316 of the bottom lens 190.

Preferably, one of the housings 306 is used for each lens 12 of the mask. As described above, the housings are angled to direct air bubbles away from the diver's field of view toward the back of the mask 10.

FIGS. 39 through 44 show two generally hemispherically-shaped meniscus lenses 262 of the diving mask 10. Note that each lens 262 has an integrally formed bottom lens 190. Bottom lens 190 may be a portion or segment of a larger hemispherically-shaped lens. However, lens 190 may have any other desirable shape, as explained above, e.g., plano-plano, plano-convexo, etc. Note that the top 318 of the pair of lenses 262 is formed to fit the support portion 169 of the mask 10. However, top portion 318 may have any desirable shape. The bottom lenses 190 are formed to provide collecting areas 198 for draining water inside the mask.

Figure 44:
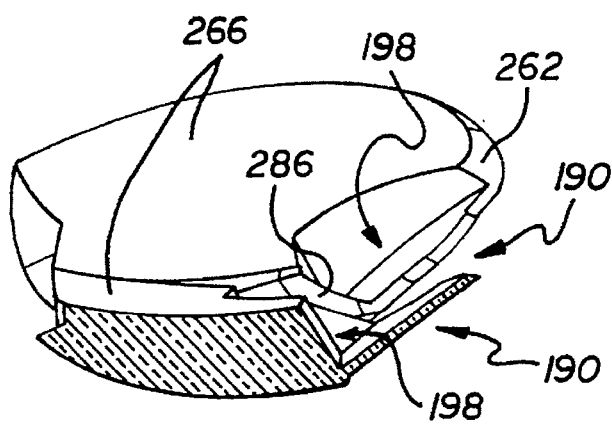
FIG. 44 is a cross-sectional view taken in the direction of arrows 44—44 shown in FIG. 42.

As discussed above in connection with FIG. 33, the spherical centers of curvature 268 and 278 of the lenses 262 are located below the centers 272 of a diver's eyes. As best illustrated in FIG. 44, this locates the thicker portions of the lenses 262 near the collecting areas 198, and helps to reduce the weight of the lenses. Also, because the thicker portions of the lenses 262 are located near areas 198, this facilitates drainage into the collecting areas.

As explained above, surfaces 286 may be textured or coated to provide translucent surfaces in order to prevent double vision.

Meniscus lenses 256 may be used for the diving mask instead of lenses 262, described above. Any suitable optical material may be used for the lenses 12,256 and 262, such as polycarbonate, glass, or any other refractive material. Any parts or features of the diving mask 10 described above may be used in combination with any other parts.

The above description discloses the preferred embodiments of the present invention. However, persons of ordinary skill in the art are capable of numerous modifications once taught these principles. Accordingly, it will be understood by those skilled in the art that changes in form and details may be made to the above-detailed embodiments without departing from the spirit and scope of the invention.

I claim:

1. An underwater diving mask comprising:

a flexible portion, two generally hemispherically-shaped lenses, having peripheral edges, mounted on said flexible portion, each of said lenses having an outer surface radius of curvature greater than 2.5 inches and inner and outer curvatures providing an approximately zero diopter value throughout a horizontal field of view of approximately 180 degrees when said lenses are under water; and means for releasably securing said flexible portion to a face of a user, said peripheral edges of said hemispherically-shaped lenses being shaped to substantially fit contours of said user's face so that a spherical center of curvature of each of said hemispherically-shaped lenses substantially coincides with an optical nodal point of a corresponding eye of said user's face.

2. The diving mask of claim 1 wherein said flexible portion has a nose portion sized to substantially fit a nose of said user.

3. The diving mask of claim 1 wherein said hemispherically-shaped lenses have an external diameter in the range of from about 4.25 inches to about 9.0 inches.

4. The diving mask of claim 3 wherein said hemispherically-shaped lenses have a horizontal field of view of about 180 degrees and a vertical field of view of about 150 degrees.

5. The diving mask of claim 4 wherein said lenses are made out of plastic.

6. The diving mask of claim 4 wherein said lenses are made out of glass.

7. The diving mask of claim 1 wherein said peripheral edges of said hemispherically-shaped lenses are shaped to substantially coincide with a laser scanned profile of said user's face.

8. An underwater diving mask comprising:

a flexible portion, two generally hemispherically-shaped lenses, having peripheral edges, mounted on said flexible portion; and means for releasably securing said flexible portion to a face of a user, said peripheral edges of said hemispherically-shaped lenses being shaped to substantially fit contours of said user's face so that a spherical center of curvature of each said hemispherically-shaped lenses substantially coincides with an optical nodal point of a corresponding eye of said user's face, wherein said flexible portion includes a skirt portion having an elongated cavity therein and apertures passing into said cavity from outside said skirt portion so that water fills said cavity when said diving mask is used under water.

9. The diving mask of claim 8 wherein said skirt portion further includes clevis arms that engage said lenses and flexible curved extensions that contact said user's face.

10. An underwater diving mask comprising:

a flexible portion, two generally hemispherically-shaped lenses, having peripheral edges, mounted on said flexible portion;

means for releasably securing said flexible portion to a face of a user, said peripheral edges of said hemispherically-shaped lenses being shaped to substantially fit contours of said user's face so that a spherical center of curvature of each of said hemispherically-shaped lenses substantially coincides with an optical nodal point of a corresponding eye of said user's face; and retractable corrective lenses mounted to said hemispherically-shaped lenses.

11. An underwater diving mask comprising:

two generally hemispherically-shaped lenses, each of said lenses having an outer surface radius of curvature greater than 2.5 inches, and inner and outer curvatures providing an approximately zero diopter value under water; and means for mounting said lenses on a face of a user so that a spherical center of curvature of each of said lenses substantially coincides with an optical nodal point of a corresponding eye of said user.

12. The diving mask of claim 11 wherein said mounting means comprises:

a flexible portion;

a contoured portion attached to said flexible portion and said lenses and sized to substantially fit contours of said user's face; and means for releasably securing said flexible portion to said user's face.

13. An underwater diving mask comprising:

two generally hemispherically-shaped lenses; and means for mounting said lenses on a face of a user so that a spherical center of curvature of each of said lenses substantially coincides with an optical nodal point of a corresponding eye of said user, wherein said mounting means comprises;.

a flexible portion;

a contoured portion attached to said flexible portion and said lenses and sized to substantially fit contours of said user's face; and means for releasably securing said flexible portion to said user's face;

wherein said flexible portion has a skirt portion having an elongated cavity therein and apertures passing into said cavity from outside said skirt portion so that water fills said cavity when said diving mask is used under water.

14. The diving mask of claim 13 wherein said skirt portion further has clevis arms that engage said contoured portion and flexible curved extensions that contact said user's face.

15. The diving mask of claim 14 wherein said lenses are made out of plastic.

16. The diving mask of claim 14 wherein said lenses are made out of glass.

17. An underwater diving mask comprising:

two generally hemispherically-shaped lenses;

means for mounting said lenses on a face of a user so that a spherical center of curvature of each of said lenses substantially coincides with an optical nodal point of a corresponding eye of said user; and retractable corrective lenses mounted to said hemispherically-shaped lenses.

18. A method of fabricating a diving mask comprising the steps of:

forming two hemispherically-shaped lenses, each of said lenses having an outer surface radius of curvature greater than 2.5 inches, and inner and outer curvatures providing an approximately zero diopter valise under water;

measuring the contours of a user's face;

forming peripheral edges of said lenses to substantially fit said contours of said user's face; and mounting said lenses on a flexible portion so that a spherical center of curvature of each of said lenses when mounted on said flexible portion substantially coincides with an optical modal point of a corresponding eye of said user's face.

19. The method of claim 18 wherein said step of measuring contours includes scanning said contours.

20. The method of claim 19 wherein said scanning step includes using a laser beam.

21. The method of claim 18 wherein said step of measuring contours includes topographically mapping said contours.

22. A method of fabricating a diving mask comprising the steps of:

forming two hemispherically-shaped lenses, each of said lenses having an outer surface radius of curvature greater than 2.5 inches, and inner anal outer curvatures providing on approximately zero diopter value under water;

measuring the contours of a user's face;

forming a contoured portion to substantially fit said contours of said user's face;

attaching said contoured portion to a flexible portion; and mounting said lenses on said contoured portion so that a spherical center of curvature of each of said lenses when mounted on said contoured portion substantially coincides with an optical nodal point of a corresponding eye of said user's face.

23. An underwater diving mask comprising:

a flexible gasket;

two generally hemispherically-shaped lenses mounted on said flexible gasket, each of said lenses having an outer surface radius of curvature greater than 2.5 inches, and inner and outer curvatures providing an approximately zero diopter value under water; and means for releasably securing said diving mask to a face of a user, said hemispherically-shaped lenses being mounted on said flexible gasket so that a spherical center of curvature of each of said hemispherically-shaped lenses substantially coincides with a center of rotation of a corresponding eye of said user's face.

24. The diving mask of claim 23 wherein said hemispherically-shaped lenses have an external diameter in the range of from about 4.25 inches to about 9.0 inches.

25. The diving mask of claim 24 wherein said hemispherically-shaped lenses have a horizontal field of view of about 180 degrees and a vertical field of view of about 150 degrees.

26. The diving mask of claim 23 wherein said means for releasably securing said diving mask includes straps, a flange attached to said lenses, and a clamp attached to said flange and said straps, said flexible gasket having a portion thereof clamped between said clamp and said flange.

27. The diving mask of claim 23 wherein said lenses are made out of plastic.

28. The diving mask of claim 23 wherein said lenses are made out of glass.

29. The diving mask of claim 23 wherein said hemispherically-shaped lenses are joined at an edge adjacent to a nose of said user's face.

30. The diving mask of claim 29 wherein said edge is located 'a distance from said user's nose having a range of from about 1 cm to about 50 cm.

31. An underwater diving mask comprising:

two generally hemispherically-shaped lenses, each of said lenses having an outer surface radius of curvature greater than 2.5 inches, and inner and outer curvatures providing an approximately zero diopter value throughout a horizontal field of view of approximately 180 degrees when said lenses are under water; and means for mounting said lenses on a face of a user so that a spherical center of curvature of each of said lenses substantially coincides with a center of rotation of a corresponding eye of said user.

32. The diving mask of claim 31 wherein said mounting means comprises:

a flexible gasket;

a clamp attached to said lenses and to said flexible gasket; and means attached to said clamp for releasably securing said flexible gasket to said user's face.

33. The diving mask of claim 32 further comprising a flange attached to said lenses, said flexible gasket having a portion thereof clamped between said clamp and said flange.

34. The diving mask of claim 32 wherein said lenses are made out of plastic.

35. The diving mask of claim 31 wherein said mounting means comprise a flexible gasket and a support portion.

36. An underwater diving mask comprising:

a flexible gasket;

two generally hemispherically-shaped lenses mounted on said flexible gasket;

means for releasably securing said diving mask to a face of the user; and at least one purge valve located in said diving mask so that bubbles formed when water is expelled from said mask pass away from the field of vision of said user.

37. The diving mask of claim 36 wherein each of said lenses has a collecting area, each of said purge valves being located in said collecting area.

38. The diving mask of claim 37 wherein said collecting area is formed at angles measured from horizontal and vertical lines, said angles being measured when a head of said user is oriented in a vertical position.

39. The diving mask of claim 38 wherein said angle measured from said horizontal line has a range of from about 30 degrees to about 90 degrees.

40. The diving mask of claim 38 wherein said angle measured from said vertical line may have a value up to about 60 degrees.

41. The diving mask of claim 36 wherein said securing means includes a support portion, said purge valve being located in said support portion.

42. The diving mask of claim 36 wherein each of said lenses has a spherical center of curvature that substantially coincides with a center of rotation of a corresponding eye of said user.

43. A method of fabricating a diving mask comprising the steps of:

forming two hemispherically-shaped lenses, each of said lenses having an outer surface radius of curvature greater than 2.5 inches, and inner and outer curvatures providing an approximately zero diopter value under water;

measuring the contours of a user's face;

forming said lenses to substantially fit said contours of said user's face; and mounting said lenses on a flexible portion so that a spherical center of curvature of each of said hemispherically-shaped lenses substantially coincides with a center of rotation of a corresponding eye of said user's face.

44. A method of fabricating a diving mask comprising the steps of:

selecting two hemispherically-shaped lenses of a predetermined size, each of said lenses having an approximately zero diopter value throughout a horizontal field of view of approximately 180 degrees when said lenses are under water;

selecting a flexible gasket of a predetermined size to fit a user's face;

selecting a support portion of a predetermined size;

attaching said support portion to said flexible gasket; and mounting said lenses on said support portion so that a spherical center of curvature of each of said hemispherically-shaped lenses substantially coincides with a center of rotation of a corresponding eye of said user's face.

45. An underwater diving mask comprising:

two generally hemispherically-shaped lenses, each of said lenses having an outer surface radius of curvature greater than 2.5 inches, and inner and outer curvatures providing an approximately zero diopter value under water;

a bottom lens formed in at least one of said hemispherically-shaped lenses; and means for mounting said lenses on a face of a user so that a spherical center of curvature of each of said lenses substantially coincides with a corresponding eye of said user.

46. The diving mask of claim 45 comprising an additional lens mounted inside said mask.

47. The diving mask of claim 46 further comprising a member attached to said additional lens and one of said hemispherically-shaped lenses providing a trapped dry-air space.

48. The diving mask of claim 45 further comprising a transparent wall mounted inside said mask.

49. The diving mask of claim 48 further comprising a member attached to said transparent wall and one of said hemispherically-shaped lenses providing a trapped dry-air space.

50. The diving mask of claim 45 wherein said bottom lens includes a removable corrective lens.

51. An underwater diving mask comprising:

two generally hemispherically-shaped lenses, each of said lenses having an outer surface radius of curvature greater than 2.5 inches, and inner and outer curvatures providing an approximately zero diopter value throughout a horizontal field of view of approximately 180 degrees when said lenses are under water;

a translucent baffle attached to said lenses, wherein said translucent baffle inhibits a right eye of a user from viewing through the left hemispherically-shaped lens and a left eye of the user from viewing through the right hemispherically-shaped lens; and means for mounting said lenses on a face of the user so that a spherical center of curvature of each of said lenses substantially coincides with a corresponding eye of said user.

52. The diving mask of claim 51 wherein said lenses have end portions bent inward toward said face.

53. An underwater diving mask comprising:

two generally hemispherically-shaped lenses, each of said lenses having an outer surface radius of curvature greater than 2.5 inches, and inner and outer curvatures providing an approximately zero diopter value under water;

a flexible face seal;

a perimeter clamp clamping said face seal to said mask; and means for mounting said lenses on a face of a user so that a spherical center of curvature of each of said lenses substantially coincides with a corresponding eye of said user.

54. The diving mask of claim 53 further including a support portion, said support portion including integrally formed housings for purge valves.

55. An underwater diving mask comprising:

two generally hemispherically-shaped lenses;

a flexible face seal;

a perimeter clamp clamping said face seal to said mask, said perimeter clamp including integrally formed housings for purge valves; and means for mounting said lenses on a face of a user so that a spherical center of curvature of each of said lenses substantially coincides with a corresponding eye of said user.

56. An underwater diving mask comprising:

two generally hemispherically-shaped meniscus lenses designed to provide an approximately zero diopter value under water, each of said lenses having an outer diameter of greater than 2.5 inches and each of said lenses providing an in-focus peripheral vision of more than 90 degrees; and means for mounting said lenses on a face of a user.

57. The diving mask of claim 56 wherein said lenses provide an in-focus peripheral vision of about 180 degrees.

58. The diving mask of claim 56 wherein each of said lenses has inner and outer surfaces of different curvature.

59. The diving mask of claim 58 wherein each of said inner and outer surfaces have spherical centers of curvature located behind centers of the eyes of said user.

60. The diving mask of claim 58 wherein each of said inner and outer surfaces have spherical centers of curvature located below centers of the eyes of said user.

61. An underwater diving mask comprising:

two generally hemispherically-shaped meniscus lenses designed to provide a zero diopter value under water, each of said lenses having inner and outer surfaces of different curvature, said inner and outer surfaces having spherical centers of curvature that are located behind centers of the eyes of a user, wherein said outer surface has a radius of curvature greater than 2.5 inches; and means for mounting said lenses on a face of said user.

62. The diving mask of claim 61 wherein said meniscus lenses provide a peripheral field of vision from about 90 degrees to about 180 degrees.

63. The diving mask of claim 61 wherein said inner and outer surfaces have spherical centers of curvature that are located below centers of the eyes of said user.

64. The diving mask of claim 61 wherein said outer surface has a outer diameter in a range of from about 4.25 inches to about 9.0 inches.

* * * * *